(12) United States Patent
Fluxá Rodriguez et al.

(10) Patent No.: US 10,133,962 B2
(45) Date of Patent: Nov. 20, 2018

(54) METHOD OF DIGITAL INFORMATION CLASSIFICATION

(71) Applicant: Cytognos, S.L., Salamanca (ES)

(72) Inventors: Rafael Fluxá Rodriguez, Salamanca (ES); José Alberto Orfao de Matos Correia E Vale, Salamanca (ES); Juan Bernardo Hernández Herrero, Salamanca (ES)

(73) Assignees: Cytognos, S.L., Salamanca (ES); Universidad de Salamanca, Salamanca (ES)

( * ) Notice: Subject to any disclaimer, the term of this patent is extended or adjusted under 35 U.S.C. 154(b) by 0 days.

(21) Appl. No.: 15/618,437

(22) Filed: Jun. 9, 2017

(65) Prior Publication Data

US 2018/0181835 A1   Jun. 28, 2018

(30) Foreign Application Priority Data

Dec. 23, 2016   (EP) .................................... 16382649

(51) Int. Cl.
  *G06K 9/62*   (2006.01)
  *G06F 17/30*   (2006.01)
  *G06K 9/00*   (2006.01)

(52) U.S. Cl.
  CPC ..... *G06K 9/6218* (2013.01); *G06F 17/30601* (2013.01); *G06K 9/00147* (2013.01)

(58) Field of Classification Search
  CPC .............. G06K 9/6218; G06K 9/00147; G06F 17/30601
  See application file for complete search history.

(56) References Cited

U.S. PATENT DOCUMENTS 9,164,022 B2   10/2015   Zhu et al.
2003/0009470 A1*   1/2003   Leary ................ G06F 17/30333
(Continued)

FOREIGN PATENT DOCUMENTS

EP   1785899 A2   5/2007

OTHER PUBLICATIONS

"Study on density peaks clustering based on k-nearest neighbors and principal component analysis" of Du Mingjing et al., published on Knowledge-Based Systems, vol. 99, dated Feb. 9, 2016; pp. 135-145.
(Continued)

*Primary Examiner* — David F Dunphy
(74) *Attorney, Agent, or Firm* — Reising Ethington P.C.

(57) ABSTRACT

The invention relates to a computer-implemented method for classifying events present in a sample, wherein each event is characterized by a multidimensional set of parameters obtained by means of hardware and/or software, wherein the values of the parameters associated with each event define the position coordinates of said event in a multidimensional space. Said method comprises the following stages: a) clustering the events in groups, b) checking if within each formed group there is a connection between events exceeding a maximum distance threshold, c) calculating the affinity between each pair of previously generated sample groups, d) comparing each sample group with at least one reference group stored in at least one database, e) classifying the sample groups based on the comparisons with the reference groups.

15 Claims, 8 Drawing Sheets

(56) References Cited

U.S. PATENT DOCUMENTS

| | | | | |
|---|---|---|---|---|
| 2003/0065632 A1* | 4/2003 | Hubey | ............... | G06K 9/6218 |
| | | | | 706/15 |
| 2005/0120105 A1* | 6/2005 | Popescu | ................ | H04L 41/00 |
| | | | | 709/223 |
| 2006/0263833 A1* | 11/2006 | Loken | ............... | G01N 15/1456 |
| | | | | 435/7.23 |
| 2013/0013631 A1* | 1/2013 | Rodinger | .......... | G06F 17/30598 |
| | | | | 707/769 |
| 2013/0060775 A1 | 3/2013 | Qiu et al. | | |
| 2014/0104309 A1* | 4/2014 | Kandogan | ............ | G09G 5/377 |
| | | | | 345/629 |
| 2015/0286707 A1* | 10/2015 | Levitan | ............ | G06F 17/30598 |
| | | | | 707/737 |
| 2016/0070950 A1 | 3/2016 | Chen | | |
| 2016/0328654 A1* | 11/2016 | Bauer | ................... | G06N 5/048 |
| 2016/0342830 A1* | 11/2016 | Ariizumi | ............ | G06K 9/00335 |
| 2017/0076187 A1* | 3/2017 | Nakane | ............. | G06K 15/1867 |
| 2017/0339168 A1* | 11/2017 | Balabine | ............. | H04L 63/1416 |
| 2017/0371886 A1* | 12/2017 | Chen | .................. | G06F 17/3071 |

OTHER PUBLICATIONS

"Automatic Classification of Cellular Expression by Nonlinear Stochastic Embedding (ACCENSE)" of K. Shekhar et al, published on Proceedings National Academy of Sciences PNAS, vol. 111, No. 1, dated Nov. 19, 2013; 45 pages.

"Mapping the Diversity of Follicular Helper T Cells in Human Blood and Tonsils Using High-Dimensional Mass Cytometry Analysis" of Michael T. Wong et al., published on Cell Reports, vol. 11. No. 11, dated Jun. 23, 2015; 13 pages.

European Search Report for EP16382649 dated Jun. 1, 2017, 3 pages.

* cited by examiner

METHOD OF DIGITAL INFORMATION CLASSIFICATION

OBJECT OF THE INVENTION

The present invention belongs to the technical field of digital information classification and relates to a computer-implemented method for the automatic clustering and classification of events characterized by a multidimensional set of parameters.

BACKGROUND OF THE INVENTION

There is currently a large number of techniques (for example flow and scanning cytometry, mass cytometry, confocal microscopy, thermal cyclers, plate microarrays and microarrays on spheres, ultrasequencing, etc.) applied to several fields (for example proteomics, genomics, cytomics, cellular, metabolomics, etc.) for analyzing biological samples (for example samples of blood, bone marrow, tissues, biological liquids, yeasts, bacteria, foods, body fluids, cell cultures, etc.). These techniques provide measurements of a series of heterogeneous parameters, in digital format, defining each event separately. In the context of the invention, "event" will be understood as each element detected by means of hardware and/or software and defined by a set of parameters obtained by means of said hardware and/or software. The events can be biological or artificial. A cell is an example of a biological event; a microsphere is an example of an artificial event.

This enormous amount of information associated with events, preferably biological events, can be represented in a multidimensional space, where the values of the parameters define the position coordinates of the events in said multidimensional space. Each analysis or experiment performed on a sample can include from thousands to several millions of events with their corresponding associated parameters. The analysis of this data, which involves classifying the events in populations, can be done manually, but this process slows down considerably as the number of parameters to be analyzed increases. The trend in recent years in the fields of chemistry, medicine and biology is for the acquisition software of biomedical devices (e.g. cytometers, thermal cyclers, ultrasequencers, etc.) to take increasingly more complex measurements, with a larger number of heterogeneous parameters. This makes it very complicated to manually analyze large amounts of information that are obtained and requiring using a great deal of time, resources and specialized experts to perform said analysis.

The methods conventionally used to solve this problem involve carrying out a number of manual steps for each population to be identified, such as data selection, cleaning, classification and reclassification, which drastically increases the number of steps according to the number of parameters analyzed. In an analysis of n parameters, it would be necessary to analyze $(n*(n-1)/2)$ individual two-dimensional graphs in which the representation of all the combinations of two parameters can be seen. Most of the time the user does not manually analyze all the populations present in the sample, but rather only takes into account the population considered to be of interest, ignoring a large amount of information that could be relevant, particularly in disease diagnosis, prognosis and monitoring. Furthermore, the user performing manual analysis must be a person skilled in the art of analysis to obtain reliable results that can be reproduced by another user. Nonetheless, analyses are not always completely objective, with the risks and inaccuracies this entails.

There are methods of automatic population clustering in the literature, many of which are based on finite mixture distribution models, such as the one described in patent document U.S. Pat. No. 9,164,022, or agglomerative hierarchical methods, such as the one referred to in patent document US20130060775. However, these methods require the user possessing prior knowledge, because the user must previously define the number of groups to be detected or a threshold defining the iterations until the number of groups identified is equal to the number of target groups defined by the user.

The prior art relating to methods of automatic data classification in a multidimensional space is very scarce. Patent document EP1785899A2 is known, describing a method that uses a finite mixture model characterized by expected Gaussian distributions and expert databases for clustering the data by means of applying expectation and maximization algorithms. This method is envisaged for repetitive analyses where the same type of samples are always analyzed, in which the populations present in the sample always have to be known beforehand, but it is rather ineffective in cases in which the populations are unknown, when the populations follow a type of non-Gaussian distribution or when it is complicated to infer data about the distribution of the populations.

A method of automatic event-associated information classification that is more efficient and more reliable is therefore necessary.

DESCRIPTION OF THE INVENTION

The present invention solves the aforementioned problems by means of a method according to independent claim 1, a system of classification according to independent claim 13 and a computer program according to independent claim 15. The dependent claims define preferred embodiments of the invention.

In a first inventive aspect, a computer-implemented method for classifying events present in a sample is defined. Each event is characterized by a multidimensional set of numerical parameters, obtained by means of hardware and/or software. The values of the numerical parameters associated with each event define the position coordinates of said event in a multidimensional space. The method comprises the following stages:

a) clustering the events in groups, comprising:
   a1) determining the density of each event, and
   a2) connecting each event with its closest neighbor event denser than it is, from among the K closest neighbor events with respect to said event in the multidimensional space, K being a predefined natural number, such that the connected events verify being part of a group, and wherein in the case of not finding a denser event among the K closest neighbor events, a group is formed with the events that have been connected with one another and stage a2) continues to be performed with another event to start forming a new group;

b) checking if within each formed group there is a connection between events exceeding a maximum distance threshold, said maximum distance threshold being pre-established based on the connections between events of the group itself, and in the case a connection between events exceed said maximum distance threshold, disconnecting those events, generating two subgroups for each pair of events that are disconnected;

c) calculating the affinity between each pair of sample groups resulting from the preceding stage, wherein the affinity between two sample groups is calculated based on the number of pairs of neighbor events verifying that one of the events of the pair of neighbor events is one of the $K_{af}$ closest neighbor events with respect to the other event of the pair of neighbor events, and wherein one of the events of the pair of neighbor events is part of one of said two groups and the other event of the pair of neighbor events is part of the other one of said two groups, and based on the distances between said events, $K_{af}$ being a predefined natural number; and joining the two sample groups when the affinity between said groups exceeds a pre-established minimum affinity threshold;

d) comparing each sample group with at least one reference group stored in at least one database, wherein the comparison comprises:
  reducing the dimensionality of the data of the sample group together with the data of the reference group until obtaining a two-dimensional representation of both groups, and
  determining for each two-dimensional representation the medians and deviation curves of the reference groups; and e) classifying the sample groups based on the comparisons with the reference groups, using as a classification criterion the belonging of the median of the sample group and/or the belonging of a minimum percentage of events of the sample group to the deviation curves of the reference groups from the database.

In a first stage, the method of the invention forms groups of events by applying an inter-event distance calculation and event density calculation. To that end, the density of each event is determined. Subsequently, each event is connected with its closest neighbor event denser than it is, from among the K closest neighbor events with respect to said event, i.e., the K events closest in distance to said event in the multi-dimensional space. The events connected to one another verify being part of one and the same group. When the closest and denser neighbor event found already belongs to a group, the current group is joined with said group. This iterative process continues until having gone through all the events of the sample.

K is a configurable natural number which determines the sensitivity level of the method and can range between 1 and the total number of events in the sample. In one embodiment, the value of parameter K is established according to the minimum population size to be found in the sample. Preferably, K is less than or equal to the minimum population size to be found in the sample. For example, in one embodiment, if populations having a minimum size of 10 events are to be found, K is defined as less than or equal to 10, whereas if such small populations are not to be found, a larger K is defined.

The formed groups are subjected to a checking stage, in which it is verified if within each formed group there is a connection between events exceeding an established maximum distance threshold, and should a connection between events exceed said maximum distance threshold, the method of the present invention disconnects said events, and generates two subgroups for each pair of events that have been disconnected. The maximum distance threshold is established for each group based on the connections between events of the group itself.

Furthermore, the method of the invention takes into account the affinity between pairs of groups. The affinity between two groups is calculated based on the number of pairs of neighbor events existing between events of said groups and on the distances between said events. When the affinity between two groups exceeds a minimum affinity threshold, the two groups are joined. The minimum affinity threshold represents the minimum relationship between two groups necessary for considering them as one and the same group.

"Pair of neighbor events" will be understood as a pair of events such that one of the two events is one of the closest neighbor events with respect to the other event. For calculating the affinity between two groups, the pairs of neighbor events are considered in which one of the two events of the pair of neighbor events is one of the $K_{af}$ closest neighbor events with respect to the other event of the pair of neighbor events and in which one of the events of the pair of neighbor events is part of one of the two groups and the other event of the pair of neighbor events is part of the other one of the two groups. $K_{af}$ is a predefined natural number determining the number of closest neighbor events considered in the affinity calculation. The value of $K_{af}$ is comprised between 1 and the total number of events in the sample. In one embodiment, the number of closest neighbor events considered in the affinity calculation is equal to the number of closest neighbor events considered in stage a2), i.e., $K_{af}=K$.

The method of the invention allows clustering and declustering the events until obtaining groups with a configurable minimum sensitivity level. Said sensitivity level is determined by the pre-established minimum affinity threshold and by the predefined number of neighbor events K. Therefore, this first phase of the method of the invention allows clustering events belonging to any type of population, both large populations and small or rare populations, without needing to indicate the number of groups to be detected in the sample, regardless of the knowledge of the user and without using expert databases.

The value of the minimum affinity threshold and of the number of neighbor events K will depend on the type of sample on which the method of classification is applied and on the sensitivity required to meet the objective of the analysis for said type of sample. Once established, the minimum affinity threshold and the number of neighbor events K (as well as the number of neighbor events $K_{af}$) can be maintained constant for all the cases to be analyzed of one and the same type of sample, except if in some case the sensitivity level is to be modified.

In a preferred embodiment, the method comprises a prior adjustment stage for adjusting the minimum affinity threshold for a type of sample, said stage comprising the following steps:

(i) providing a multidimensional data set comprising parameters associated with events of a sample representative of said type of sample;

(ii) establishing an initial minimum affinity threshold, preferably 0.5;

(iii) performing the method according to the first inventive aspect on the events characterized by the data set comprising parameters provided in step (i), establishing the number of closest neighbor events $K_{af}$ considered in affinity calculation stage c) equal to the number of closest neighbor events K considered in stage a2) of the method, i.e., $K_{af}=K$; and (iv) determining if the minimum affinity threshold used is suitable, with the following criterion:

in the case that groups of events that must be different and must be treated separately have been joined together, the value of the minimum affinity threshold increases, for example by 0.1, and steps (iii) and (iv) are repeated;

in the event that the groups of events have been separated too much and so much sensitivity is not necessary, the value of the minimum affinity threshold is reduced, for example by 0.1, and steps (iii) and (iv) are repeated;

in the event that the sensitivity achieved with the initial minimum affinity threshold established in step (ii) is suitable, said value of the initial minimum affinity threshold is established as minimum affinity threshold for said type of sample and the prior adjustment stage for adjusting the minimum affinity threshold ends.

Each group obtained from the first clustering phase of the method of the present invention, which encompasses stages a), b) and c), is classified in a second classification phase encompassing stages d) and e).

In the classification phase, the method of the invention uses a dimensional reduction algorithm and comparisons with reference groups from at least one database for automatically identifying the populations present in the sample, wherein each reference group corresponds to a specific population. To that end, each sample group resulting from the clustering phase is compared with at least one reference group stored in at least one database. The comparison comprises:

reducing the dimensionality of the data of the sample group together with the data of the reference group until obtaining a two-dimensional representation of both groups, and determining for each two-dimensional representation the medians and deviation curves of the reference groups.

In one embodiment, the reference groups are formed by the analysis of a plurality of samples and the medians of each reference group from the database represent each analysis forming said reference group. In other embodiment, each reference group from the database is formed by the analysis of one sample and has only one median which represents said analysis. In other embodiments there are one or more reference groups from the database formed by the analysis of a plurality of samples and having a plurality of medians, each median representing each analysis forming said reference group, and there are also one or more reference groups from the database formed by the analysis of one sample and having only one median, which represents the analysis forming said reference group. Preferably, the deviation curves of the reference group are with respect to the total population of the reference group.

It will be understood that the data of the sample group are the values of the set of parameters associated with the events forming part of said sample group and the data of the reference group are the values of the set of parameters associated with the events forming part of the reference group.

The median of a group represents the value of the centrally positioned variable in an ordered data set. The deviation curve of a group represents the curve around the mean in a two-dimensional space enclosing a specific percentage of events therewithin. In one embodiment, the percentage of events enclosed within the deviation curve is comprised between 68% and 99%.

The sample groups are classified based on the comparisons with the reference groups from the database. To that end, the following is used as a classification criterion:

the belonging of the median of the sample group to the deviation curves of the reference groups, and/or the belonging of a minimum percentage of events of the sample group to the deviation curves of the reference groups from the database.

In the first case, the median of each sample group additionally determined for each two-dimensional representation, and it is checked if the median of the sample group is within the area enclosed by the deviation curve of the reference group. In the second case, it is checked if a percentage of events of the sample group greater than or equal to a predefined minimum percentage is within the area enclosed by the deviation curve of the reference group. When the classification criterion used in the comparison with a reference group is met, it is considered that the sample group corresponds to said reference group. These classification criteria can be used separately or combined with one another. In one embodiment, both classification criteria are used combined with one another, and in the event that both classification criteria are met, it is considered that the sample group corresponds to the reference group.

The method of the invention allows automating the process of clustering events in a multidimensional space defined by their parameters, obtaining groups of events sharing common characteristics, and comparing said obtained groups with one or more dynamic reference databases previously created by experts, achieving thereby the automatic classification of the sample groups and allowing their subsequent graphical representation if desired. In one embodiment, a database previously created by experts with normal populations is used for the classification of the sample groups. In the case that any of the sample groups do not correspond to any of the normal populations, said groups are compared with reference groups from one or more pathological population databases. In other embodiments, a single database contains reference groups corresponding to both normal and pathological populations. Therefore, the present invention allows identifying the specific pathology as long as it is contained in the databases. The method of the invention allows performing an in-depth analysis of the samples subject of study for their characterization by means of identifying the populations present in the sample.

In the context of the invention, it will be understood that actions referring to events, such as clustering, classifying or connecting events, are actions performed on the representations of the events defined by the parameters associated with said events, and not on the physical events (such as cells or other particles) present in the sample. That is because a physical event is characterized by a multidimensional set of parameters, obtained by means of hardware and/or software.

The number and heterogeneity of parameters associated with each event allows differentiating and clustering these events into different populations. In the context of the invention, as population will be understood the group of events with similar parameters associated with a specific functionality. The greater the number of parameters and the more heterogeneous these parameters are, the better defined are the populations of a sample, which allows classifying the events into smaller specific subpopulations from the analyzed parameters. This is extremely useful, for example, when characterizing the information about an individual for the diagnosis, prognosis or other evaluations of diseases.

The sample can be obtaining from human beings, animals, plants, fungi and protists, as well as of any other source, such as air, soil, water, etc.

In one embodiment, the sample is a biological sample, treated or untreated for analysis, preferably tissue, disaggregated tissue, biofluid, food, beverage, cell culture or mixtures thereof.

In the context of the present invention, the term "biofluid" refers to any secretion or biological fluid, whether it is physiological or pathological, produced in the body of a subject. These biofluids include, without limitation, blood, plasma, serum, bronchoalveolar lavage fluid, urine, nasal secretion, ear secretion, urethral secretion, cerebrospinal fluid, pleural fluid, synovial fluid, peritoneal fluid, ascitic fluid, pericardial fluid, amniotic fluid, gastric juice, lymphatic fluid, interstitial fluid, vitreous humor, saliva, sputum, liquid deposition, tears, mucus, sweat, milk, semen, vaginal secretions, fluid from an ulcer, blisters, abscesses and other surface rashes. Said samples can be obtained by conventional methods, using methods known in the state of the art by the person skilled in the art, such as drawing blood, incubating and aspirating fluid during bronchofiberscopy, cisternal puncture, ventricular or lumbar puncture, pleural puncture or thoracentesis, articulation or percutaneous synovial puncture, abdominal puncture, amniocentesis, expectoration, percutaneous peritoneal puncture, percutaneous pericardial puncture, etc., or by simple sample collection.

In a preferred embodiment, the biofluid is blood and/or cerebrospinal fluid. The blood sample is typically drawn by means of artery or vein puncture, usually a vein on the inner part of the elbow or the back of the hand, the blood sample being collected in a leak-tight vial or syringe. A capillary puncture usually in the heel or in the distal phalanges of the fingers can be done for analysis by means of a micromethod.

In a preferred embodiment, the tissue is bone marrow.

The method of the invention is not carried out on a live human or animal body. The method of the invention is an in vitro method, i.e., it is carried out in a controlled environment outside a living organism.

In one embodiment, the sample is a mixture of functionalized non-biological particles, representing artificial populations. These non-biological particles are manufactured with materials such as polymers, copolymers, latex, silica and other materials. These non-biological particles are also known in this technical field as "microparticles", "microspheres" or "spheres," and preferably have a diameter between 0.1 and 100 μm. These non-biological particles are commercially available on the market through different manufacturers, including but not limited to: Bangs Laboratories (USA), Polysciences (USA), Magsphere (USA), Spherotech Inc. (USA), Thermo Fisher (USA) and microParticles GmbH (Germany).

In one embodiment, events are any type of particle the properties of which can be measured by hardware and/or software. In a preferred embodiment, the events are cells, organelles, vesicles, viruses and/or spheres.

The cells comprise eukaryotic cells, prokaryotic cells as well as cell cultures. The eukaryotic cells comprise any cell with one or more nuclei, or their enucleated derivatives belonging to any eukaryotic organism including humans, animals, plants, fungi and/or protists. The prokaryotic cells are cells without a defined nucleus, including any type of archaeon and bacterium.

The organelles usually comprise any cell component such as the nucleus, lysosomes, chromosomes, endosomes, endoplasmatic reticulum, Golgi apparatus, etc.

Vesicles comprise non-cellular particles defined by a lipid bilayer compartment and the components thereof include polymers, proteins, peptides, receptors, etc. Both the vesicles and their components are considered events in the context of the invention.

Viruses comprise any microscopic cell parasite containing a protein and/or membrane and replicated within the cells of other organisms, including HIV, hepatitis virus, prions, virions, etc.

In one embodiment, the sample includes events of different types.

In one embodiment, the method comprises before stage a) an additional stage that comprises storing in a computer memory or in an external memory the data obtained from the hardware and/or software in digitalized form; said data includes the parameters characterizing the events of the sample.

In one embodiment, the method comprises generating a data structure made up of logs, wherein each log is configured for storing a representation of an event and its properties and one or more pointers to other logs for configuring a connection to other logs.

The distance between events is measured according to a pre-established metric. In one embodiment, the distance between events is the Euclidean distance between said events. However, other distances, such as Manhattan, can be used in other embodiments.

The density represents the number of events per unit volume in the multidimensional space. The density of an event corresponds to the density determined in the coordinates of said event in the multidimensional space. In one embodiment, the density of each event is determined from the mean distance of said event to its $K_{den}$ closest neighbor events, or from the sum of the distances of said event to its $K_{den}$ closest neighbor events, $K_{den}$ being a predefined natural number the value of which is comprised between 1 and the total number of events in the sample. In both cases, the density increases as the sum of the distance to neighbor events decreases or as the mean distance to neighbor events decreases, and the density decreases as the sum of the distance to neighbor events increases or as the mean distance to neighbor events increases. In a preferred embodiment, the number of closest neighbor events considered in the density calculation is equal to the number of closest neighbor events considered in stage a2), i.e., $K=K_{den}$. In one embodiment, said number of neighbor events $K_{den}$ is also equal to the number of closest neighbor events considered in the affinity calculation, i.e., $K=K_{den}=K_{af}$. In another embodiment, the density of an event is determined from the number of events found at a distance less than or equal to a specified distance with respect to said event. In this case, the density increases as the number of events found at a distance less than or equal to said specified distance with respect to said event increases.

In one embodiment, iterating over events on clustering stage a2) is done by going through the events in order of increasing density, in order of decreasing density or in a random order.

In one embodiment, the iteration of the phase a2) skips events already processed.

In one embodiment, distance checking stage b) comprises:
identifying in each group of events resulting from stage a) the end events, i.e., those events not receiving any connection because they do not verify being the closest and denser neighbor event with respect to any other event, from among the K closest neighbor events with respect to said event, and determining the distances between events connected along the bond graph commencing in each end event, the bond graph being defined by connections between events resulting from stage a).

According to this embodiment, two preferred options are defined for establishing the maximum distance threshold.

In one embodiment, the maximum distance threshold between two events is established for each connection of events of a bond graph as the maximum distance of the distances corresponding to the X connections of events prior to said connection of events in said bond graph, X being the number of connections considered. Preferably, X is comprised between 3 and the number of connections prior to the connection considered.

In one embodiment, the maximum distance threshold between two events of a group is established according to a logarithmic regression model estimated for distances between connected events of said group. Preferably, in this embodiment stage b) comprises obtaining a logarithmic regression model, for example using Ordinary Least Squares method (OLS), for distances between connected events along a bond graph of a group;

adding the absolute value of the differences between real distance values and distance values obtained from the logarithmic regression model for each of the connections between the events of said bond graph; and calculating the mean of said absolute values.

In this embodiment, the maximum distance threshold between two events is established as a value Y times the calculated mean of the absolute value differences between the logarithmic regression model value and the real distance value, where Y is a positive real number. Preferably, Y is comprised between 2 and 5.

In one embodiment of stage b), disconnecting events, generating two subgroups for each pair of events that are disconnected comprises: generating one group with all the events that are connected directly or indirectly (through other connections) with one of the events of the pair and generating a second group with all the events that are connected directly or indirectly (through other connections) with the other event of the pair.

In one embodiment, in affinity calculation stage c) for calculating the affinity between each pair of groups, the affinity between two groups is calculated by assigning a weight determined by a negative exponential function to each pair of neighbor events in which one of the events of the pair of neighbor events is part of one of said two groups and the other event of the pair of neighbor events is part of the other one of said two groups.

In a preferred embodiment, the affinity between two groups GA and GB ($A_{GA,GB}$) is determined as:

$$A_{GA,GB} = A_{GA \to GB} + A_{GB \to GA} \quad (\text{Eq. 1})$$

$A_{GA \to GB}$ being the affinity of group GA with respect to group GB, and $A_{GB \to GA}$ being the affinity of group GB with respect to group GA, wherein:

$$A_{GA \to GB} = \frac{1}{n_b} \sum_P \exp\left(-\frac{\|x_i^P - x_j^P\|^2}{2\sigma^2}\right) \times \frac{1}{n_b} \sum_{P'} \exp\left(-\frac{\|x_k^{P'} - x_l^{P'}\|^2}{2\sigma^2}\right) \quad (\text{Eq. 2})$$

$$A_{GB \to GA} = \frac{1}{n_a} \sum_P \exp\left(-\frac{\|x_i^P - x_j^P\|^2}{2\sigma^2}\right) \times \frac{1}{n_a} \sum_{P'} \exp\left(-\frac{\|x_k^{P'} - x_l^{P'}\|^2}{2\sigma^2}\right)$$

where P represents the subset of pairs of neighbor events where "i" is an event of group GA and "j" is an event of the $K_{af}$ closest neighbors of "i" which belongs to group GB, where P' represents the subset of pairs of neighbor events where "k" is an event of group GB and "l" is an event of the $K_{af}$ closest neighbors of "k" which belongs to group GA, where $\|x_i^P - x_j^P\|$ is the distance between the two events i and j,
where $\|x_k^{P'} - x_j^{P'}\|$ is the distance between the events k and l,
where $n_a$ is the number of events of group GA,
where $n_b$ is the number of events of group GB, and
where $\sigma$ is a configurable parameter. The greater the parameter $\sigma$, the larger the result of the function for one and the same distance. Said negative exponential function makes that in neighbor events close to one another, the obtained value approaches 1 (it would be 1 if the distance between both were 0) and moves closer to 0 as distances increase.

In one embodiment, the parameter $\sigma$ is inferred from the actual data of the groups and is calculated for each of the groups of events under study.

In one embodiment, the $\sigma$ used for the affinity of group GA is:

$$\sigma_{GA}^2 = \frac{\max d(m_1, m_2)^2 - \min d(m_1, m_2)^2}{2 \ln \frac{\max d(m_1, m_2)^2}{\min d(m_1, m_2)^2}} \quad (\text{Eq. 3a})$$

being $m_1$ an event of group GA and being $m_2$ a neighbor event of the event $m_1$, $\text{mind}(m_1, m_2)^2$ being the square of the smallest distance found between all the events of group GA and the $K_{af}$ closest neighbor events corresponding to each event, and $\text{maxd}(m_1, m_2)^2$ being the square of the largest distance found between all the events of group GA and the $K_{af}$ closest neighbor events corresponding to each event.

In another embodiment, the $\sigma$ used for determining the affinity is common to every group, the expression of Eq. 3a is used for determining $\sigma$ and $\text{mind}(m_1, m_2)^2$ and $\text{maxd}(m_1, m_2)^2$ are distances fixed and common to every group, being $\text{mind}(m_1, m_2)^2$ a value greater than 0 and less than $\text{maxd}(m_1, m_2)^2$ and being $\text{maxd}(m_1, m_2)^2$ a value greater than $\text{mind}(m_1, m_2)^2$ and less than the square of the distance between the two most distant events of the sample.

In another embodiment, the $\sigma$ used for the affinity of group GA is:

$$\sigma_{GA}^2 = \frac{\text{medd}(m_1, m_2)^2 - \min d(m_1, m_2)^2}{2 \ln \frac{\text{medd}(m_1, m_2)^2}{\min d(m_1, m_2)^2}} \quad (\text{Eq. 3b})$$

$m_1$ being an event of group GA and $m_2$ being a neighbor event of event $m_1$, $\text{mind}(m_1, m_2)^2$ being the square of the smallest distance found between all the events of group GA and the $K_{af}$ closest neighbor events corresponding to each event, and $\text{medd}(m_1, m_2)^2$ being the square of $X_{med}$ times the mean of the distances between all the events of group GA and the $K_{af}$ closest neighbor events corresponding to each event, $X_{med}$ being a positive real number. Preferably, $X_{med}$ is comprised between 1 and 5.

In both embodiments, the affinity of group GA with respect to group GB would be:

$$A_{GA \to GB} = \frac{1}{n_b} \sum_P \exp\left(-\frac{\|x_i^P - x_j^P\|^2}{2\sigma_{GA}^2}\right) \times \frac{1}{n_b} \sum_{P'} \exp\left(-\frac{\|x_k^{P'} - x_l^{P'}\|^2}{2\sigma_{GA}^2}\right) \quad (Eq.\ 4)$$

the affinity of group GB with respect to group GA would be:

$$A_{GB \to GA} = \frac{1}{n_a} \sum_P \exp\left(-\frac{\|x_i^P - x_j^P\|^2}{2\sigma_{GB}^2}\right) \times \frac{1}{n_a} \sum_{P'} \exp\left(-\frac{\|x_k^{P'} - x_l^{P'}\|^2}{2\sigma_{GB}^2}\right) \quad (Eq.\ 5)$$

and the affinity between the two groups GA and GB would be:

$$A_{GA,GB} = A_{GA \to GB} + A_{GA \to GB} \quad (Eq.\ 6)$$

wherein the parameters $\sigma_{GA}^2$, $\sigma_{GB}^2$ have been calculated according to expressions (Eq. 3a) or (Eq. 3b).

In one embodiment in comparison stage d) for comparing the groups of events from the sample with the database, each sample group is compared simultaneously with pairs of reference groups from the database, wherein as many comparisons are performed for each sample group as there are combinations of two reference groups in the database. In this embodiment, a final comparison is performed between the sample group and a candidate reference group, the candidate reference group being the reference group from the database containing the median of the sample group and/or a minimum percentage of events of the sample group within its deviation curves in a larger number of comparisons. In one embodiment, should there be more than one candidate reference group, the candidate reference group having more medians close to the median of the sample group is selected for classification. The two-dimensional representations of said candidate reference groups together with the sample group are used to select a single final candidate reference group. Preferably, the candidate reference group having more medians close to the median of the sample group among a specific number of medians Nm, is selected as the single final candidate reference group. Preferably, when the candidate reference groups have different number of medians, the number of medians, Nm, used for comparison to the median of the sample group is the number of medians of the candidate reference group having the lowest number of medians, and when the number of medians of each reference group is the same, then Nm is the number of medians of any of those groups. For example, if a first candidate reference group has six medians and a second candidate reference group has four medians, only four medians among all medians are selected as the ones closest to the median of the sample group. In this example, if three of the closest medians correspond to the first candidate reference group and one median corresponds to the second candidate reference group, the first candidate reference group is selected as the single final candidate reference group, since the first candidate reference group has more medians close to the median of the sample group than the second candidate reference group.

In one embodiment in case that no candidate reference group can be selected, the sample group is not classified as any of the reference groups of the database.

In one embodiment in comparison stage d) for comparing the groups of events of the sample with the database, dimensionality is reduced by means of principal component analysis or by means of canonical correlation analysis.

In one embodiment, in clustering stage a) for clustering events, the connection of events with neighbor events comprises:

iterating on each of the events, searching for each event, among the K closest neighbor events, the closest event denser than it is, wherein:
(i) in the event of finding a denser event, the first event is connected with said denser event and said denser event is taken as the following event in the iteration, and
(ii) in the event of not finding a denser event among the K closest neighbor events, a group is formed with the events that have been connected with one another and iteration continues with another event to start forming a new group.

In one embodiment, the method comprises evaluating compliance with at least one predefined rule, wherein said at least one rule is based on at least one statistical parameter the reference value of which is inferred from the reference groups from the database and wherein this predefined rule provides new evaluations not checked on the comparisons performed on stages d) and e). In one embodiment, the evaluation of compliance with the rule is used as an additional criterion in the classification of the sample groups and/or for checking normality of the classified groups. Additionally or alternatively, said rule can be used for generating a warning in relation to at least one classified group. In one embodiment, the statistical parameters include, without being restricted to, one or more of the following parameters: percentage of events in a population, ratio between specific populations, coefficients of variation of given parameters with respect to the mean of the actual parameter for specific populations, absence of one or more populations, standard deviations or percentiles. The percentile indicates, in an ordered data set going from lesser to greater, the value of the variable below which there is a given percentage of observations in a group of observations.

The comparison of one or more of said statistical parameters with reference values and/or intervals inferred from the database can be used as an additional criterion for identifying which populations correspond to the sample groups and/or for validating the degree of normality of the populations identified in the sample, being able to establish, for example, that a group corresponds to a given population and that at the same time it is outside normal parameters.

In one embodiment, the parameters relating to events comprise digital information obtained from proteomic, genomic, cytomic and/or metabolomic analysis.

In one embodiment, the hardware and/or software used for obtaining the parameters relating to the events of the sample is biomedical hardware and/or software.

In one embodiment, the obtained parameters come from measurements by means of flow cytometry, image cytometry, mass cytometry, impedance spectroscopy, polymerase chain reaction, confocal microscopy, mass spectrometry, gene expression microarrays and/or ultrasequencing.

In one embodiment, the database contains data resulting from the analysis of normal samples and pathological samples.

In one embodiment, the method comprises feeding back into the database information about groups resulting from the classification performed by the method of the invention. Advantageously, in this embodiment precision and efficacy of the method of the invention improve with each analysis performed, expanding the database improving the automatic classification stage.

In one embodiment, the method comprises graphically representing the groups resulting from the classification stage.

In one embodiment, $K=K_{af}$. In one embodiment in which the density of the events is determined according to the mean or total distance of each event with respect to the $K_{den}$ closest neighbor events, $K=K_{af}=K_{den}$.

In one embodiment, the method comprises storing the obtained results in physical or digital format.

The present invention has a series of advantages compared with methods of manual analysis:

The present invention enables the automatic analysis of data resulting from different biomedical techniques by expert or non-expert users, avoiding subjectivity in the analysis and the occurrence of errors. As long as the same protocols are used for obtaining the data relating to the sample, any user without prior knowledge can perform an analysis and obtain the automatic classification of the events of the sample in normal populations, as well as identify those populations departing from the defined normality patterns, so it is an optimal method for analysis in hospitals, clinics and laboratories.

The reliability of the invention in relation to the detection of populations departing from normality solves the problem of the possible lack of effectiveness in a manual analysis, taking into account that these tasks are not frequently performed and are highly dependent on the experience of the expert. The increasingly more frequent use of more dimensions for measuring more characteristics of the cells or particles also increases the difficulty of manual analyses and makes their work much more tedious. All these factors complicate the reproducibility of the results of one and the same case under study at different points in time performed manually by the same or by another expert.

The present invention provides faster analysis of the data obtained from the different biomedical techniques to which it is applied. The development of the acquisition hardware or devices applied to sample analysis means that users encounter an enormous amount of data, the manual analysis thereof being impossible in many cases, or in the best case scenario involving the need to invest a lot of time in said analysis.

The present invention allows thoroughly analyzing all the information obtained from the sample in contrast with manual analyses done by the experts which, due to the enormous amount and complexity of the data, only take into account one subset of the populations of the sample, ignoring an enormous amount of information that could be relevant.

The present invention allows not only automatically classifying the known populations in the databases, but it also allows identifying those sample groups that do not correspond to populations identified in the databases.

The possibility of using dynamic reference databases that can be customized and updated means that the method of the invention can be applied to a large number of biomedical technologies.

The use of a large number of variables in the clustering stage, including distances between events, densities and affinity, mean that the method of the invention is more precise and complete than other methods developed up until now.

The present invention has a series of advantages over other methods of automatic analysis:

Clustering events is not dependent on prior information about the groups present in the sample, such as the distribution of the data or the number of groups expected. This results in not losing populations formed by few events and detection is not limited to groups of events that are known or expected.

The database used for classifying the groups of events which at first contains the original data of the experts, allows adding data from other analyses using information not used up until now, which means that as the database is used and information is fed back to it, the population classification method will be more sensitive.

The use of a database with multiple references from different experts allows exponentially increasing the quality of the analysis performed.

In a second inventive aspect, a system for classifying events present in a sample is defined, wherein each event is characterized by a multidimensional set of parameters, the system comprising:

at least one processing module configured to receive the parameters characterizing the events of the sample and for performing the method according to the first inventive aspect of the invention.

In one embodiment, the system additionally comprises at least one representation module configured to represent the results of the classification. In one embodiment, the representation module comprises a display and/or printer configured for displaying and/or representing the obtained classification.

In one embodiment, the system comprises a physical storage system.

In one embodiment, at least one processing module can be a computer, a microprocessor, a microcontroller or an electronic device, for example, a tablet, PDA or mobile phone, configured to interpret the method and performing the stages defined according to any of the embodiments of the first inventive aspect, regardless of the native operating system or programming language in said processing module. According to this embodiment, the system can comprise several processing modules configured to work in parallel according to the stages of the first inventive aspect. In other cases, the system can have a processing module with several microprocessors and/or microcontrollers configured to work in parallel according to the stages of the first inventive aspect. Advantageously, these embodiments reduce the time for performing the method according to the first inventive aspect, thereby increasing the efficiency of said method.

In one embodiment, the system is configured to receive the parameters characterizing the events of the sample from an acquisition module. In one embodiment, the system is configured to receive the parameters characterizing the events of the sample from a physical storage system, for example, a CD, a USB memory, or a hard drive. Said physical storage system is configured for storing parameters, i.e., digital data relating to the sample. In this embodiment, the data acquisition module and/or physical storage system are configured to transmit data between them and the at least one processing module. Said transmission can be done through a communications cable or wirelessly.

In one embodiment, the system additionally comprises a data acquisition module configured to obtain the parameters characterizing the events of the sample. In this embodiment, the data acquisition module and the processing module are configured for transmitting the parameters between both modules. Said transmission can be done through a communications cable or wirelessly. In one embodiment, the acquisition module is a biomedical type.

In a third inventive aspect, a computer program comprising instructions adapted for carrying out a method according to any of the embodiments indicated in the first inventive aspect when said instructions are run in a computer is defined.

All the features described in this specification (including the claims, description and drawings) can be combined in any combination, with the exception of those combinations of such mutually exclusive features.

DESCRIPTION OF THE DRAWINGS

To complement the description that will be made below and for the purpose of helping to better understand the features of the invention according to a preferred practical embodiment thereof, a set of drawings is attached as an integral part of said description, wherein the following has been depicted with an illustrative and non-limiting character.

PREFERRED EMBODIMENT OF THE INVENTION

Figure 1:
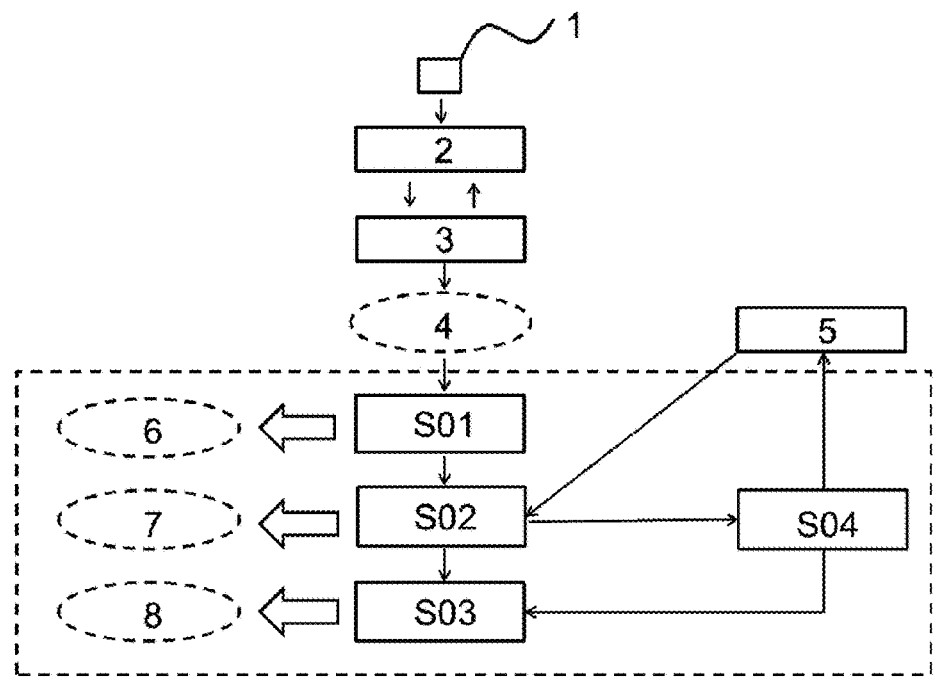
FIG. 1 shows a flowchart of an embodiment of the method of the invention.

FIG. 1 shows a flowchart of an embodiment of the method of the invention, in this case applied to the analysis of biological samples. The automatic event clustering phase (S01) and automatic event classification phase (S02) and graphic result display phase (S03) are represented in the box with discontinuous lines.

The method of the invention allows analyzing multidimensional digital data (4) relating to a sample (1). Said data contains the parameters characterizing the events of the sample, i.e., the digital information (4) obtained from the analysis of the sample by means of hardware (2) and/or software (3). In this embodiment, the sample (1) is a biological sample (1), and biomedical hardware (2) and the software (3) corresponding to said biomedical hardware (2) are used for analysis of the sample thereof. By means of the hardware (2) and/or software (3) Events present in the analyzed sample (1), for example cells in a blood sample (1), are detected and a set of parameters is measured and/or determined for each event. In one embodiment, the biomedical hardware is a flow cytometer and the parameters are measured or determined from the light diffracted by the cells present in the sample. Said parameters can include the granularity and size of each cell, the amount of proteins or the fluorescence intensity expressing the antigen of the cell bound to a marker (for example an antibody) in turn bound to a fluorescent molecule (for example a fluorochrome), in the case of a sample prepared with markers. In one embodiment, the biomedical hardware is a mass cytometer and the measured parameters include the mass to charge ratio of the ionized metals of each cell, where the cells have previously been marked with antibodies bound to metal isotopes, preferably lanthanide isotopes.

Stages (a), (b) and (c) of the method of the invention are included in the clustering phase (S01). In the clustering phase (S01), the detected events are clustered in groups by means of connecting each event with its closest neighbor event denser than it is, considering the K closest neighbor events with respect to each event. Once the groups of events are formed, the clustering phase additionally comprises dividing the formed groups when the distance between a pair of connected events exceeds a maximum distance threshold. Said maximum distance threshold is established based on the unions of the events of the group itself. Additionally, the affinity between groups is checked, and when the affinity between two groups is greater than a pre-established minimum affinity threshold, the two groups are joined forming a single group. The affinity between two groups is calculated based on the number of pairs of neighbor events existing between events of both groups and on the distances between said events. As a result of the clustering phase (S01), one or more groups of events (6) present in the sample (1) are obtained.

Stages (d) and (e) of the method of the invention are included in the classification phase (S02). In the classification phase (S02), each of the groups of events (6) formed is compared with reference groups stored in a database (5). Each reference group from the database (5) corresponds to a specific population. The comparison between groups is performed by means of dimensionality reduction techniques, identifying relationships between the compared groups, weighting the importance of the parameters and searching for the combination of parameters that separates said groups the most. The groups of events (6) identified in the sample are classified based on the comparisons with the reference groups from the database (5), using the information about the events, the medians and/or the deviation curves of the groups. As a result of the classification phase (S02), the groups (6) present in the sample (1) are associated with the corresponding reference groups from the database (5), the classified groups of the sample (7) being obtained.

Optionally, the method can include a display phase (S03), in which the sample groups are graphically represented together with or without the reference groups from the database (5), which allows the user to visually check the representation (8) of the populations in which the events of the sample have been classified.

In one embodiment, the database (5) has been previously constructed by means of manually feeding in data about known populations. Information can be fed back (S04) into the database (5) with the data resulting from the analysis of samples, incorporating the information obtained from the populations identified in analyzed samples as part of the information relating to the reference groups stored in the database (5), corresponding to said populations.

The stages of the method of the invention according to a preferred embodiment thereof are described below in further detail.

Figure 2:
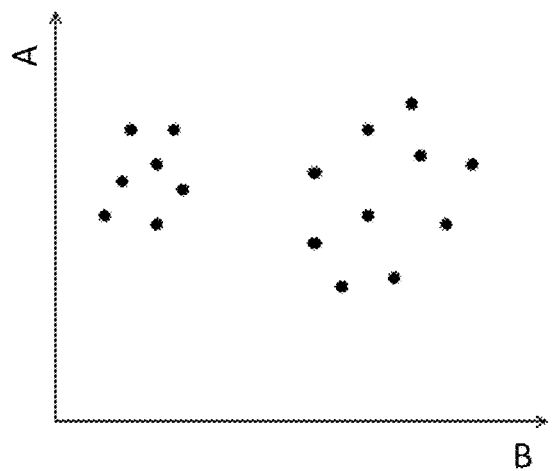
FIG. 2 shows a two-dimensional representation of events according to the value measured for two parameters A and B.

In this embodiment, the previously prepared and processed biological sample is analyzed by means of biomedical hardware measuring properties of each of the events making up the sample, such as physical properties, chemical properties, morphological properties, electrical properties, photoluminescent properties, etc. Generally, the biomedical hardware (2) has acquisition software (3) which allows sending information about the parameters obtained from each of the events to storage means for subsequent processing. Said storage means can be a computer memory or an external memory, for example. The data obtained by means of the hardware and/or software characterize the events present in the sample and can be represented in a multidimensional space, wherein the dimension of the space is the number of parameters measured for each event and wherein the obtained values of said parameters for each event define the position coordinates of said event in said multidimensional space. FIG. 2 shows a two-dimensional representation of events according to the value measured for two parameters A and B.

First Phase: Automatic Digital Data Clustering

In the clustering phase, groups of events are formed based on the data obtained by means of the hardware and/or software. Generally, the data is obtained in different formats depending on the acquisition software. Clustering events according to the method of the invention is based on a combination of stages based on inter-event distance calculation, event density calculation and inter-group affinity calculation. In one embodiment, the distance used in this phase is the Euclidean distance, although other types of distances can be used.

The main steps of the clustering phase according to this embodiment of the method of the invention are described below.

Figure 3:
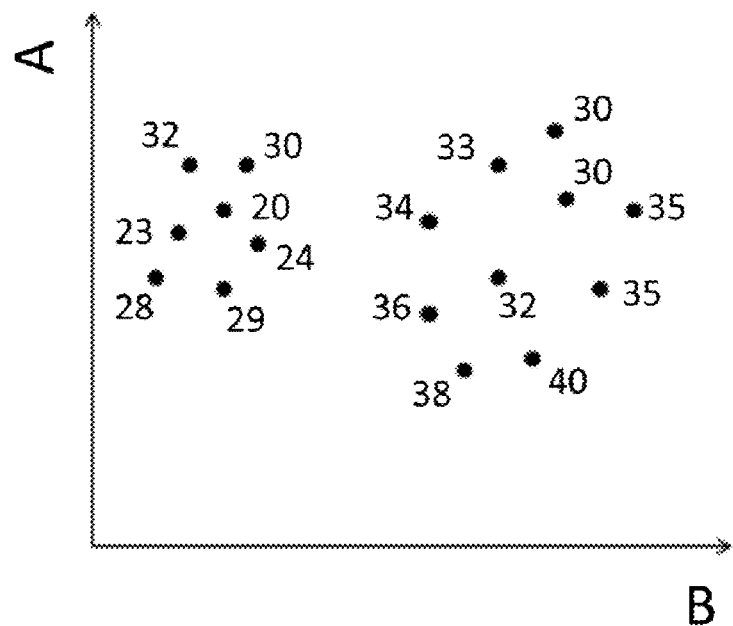
FIG. 3 shows the events of FIG. 2, together with a value indicative of the density of each event, wherein decreasing values entail increasing densities.

First, the density of each event is determined. In one embodiment, the density of each event is determined from the mean distance of said event to the $K_{den}$ neighbor events closest to it, $K_{den}$ being a predefined natural number. In another embodiment, the density of an event is determined from the sum of the distances of said event to the $K_{den}$ neighbor events closest to it. In both cases, a larger mean distance or a larger sum of distances corresponds to a lower event density. FIG. 3 shows the result of the density calculation of each event, for the events represented in FIG. 2. The number represented next to each event in FIG. 3 represents said density (the lower the number, the higher the density). In this embodiment, the number of neighbor events $K_{den}$ considered in the density calculation is equal to the number of neighbor events K considered in stage a2). The event density can also be determined as the number of neighbor events within a predefined maximum distance with respect to said event. In that case, a larger number of neighbor events would entail a higher density. Other ways of determining or estimating event density are also compatible with the method of the invention.

Once the event density is determined, for each event, the closest event denser than it is is searched for among the K closest neighbor events with respect to said event in the multidimensional space defined by the parameters measured. In the case of finding it, said neighbor event is connected with the current event and the connected neighbor event is taken as the next one to be iterated. When a denser event is not found among the K closest neighbor events with respect to a given event, a group is formed with the events that have been connected with one another and the method continues with a new event, which would start to form a new group. In the case that the closest and denser neighbor event already belongs to a group, the current group is joined with said group. This iterative process continues until having gone through all the events of the sample.

Figure 4:
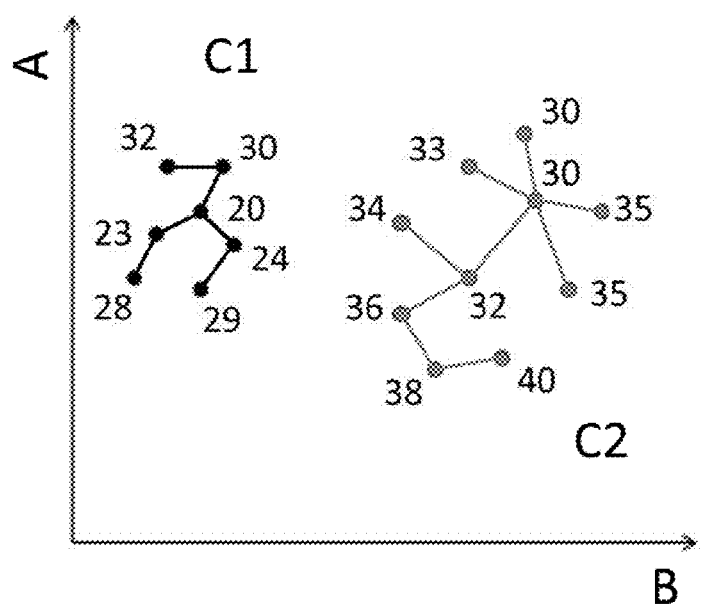
FIG. 4 shows the automatic clustering of the events of FIG. 2 in two groups (C1 and C2).

FIG. 4 shows an example of automatic clustering of the events of FIG. 2 in two groups (C1 and C2). The events belonging to group C1 are represented in black and the events belonging to the group C2 are represented in gray. The connection of each event with its closest neighbor event denser than it is is represented by means of a continuous line. In this case, the number of neighbor events considered is K=5.

Figure 5:
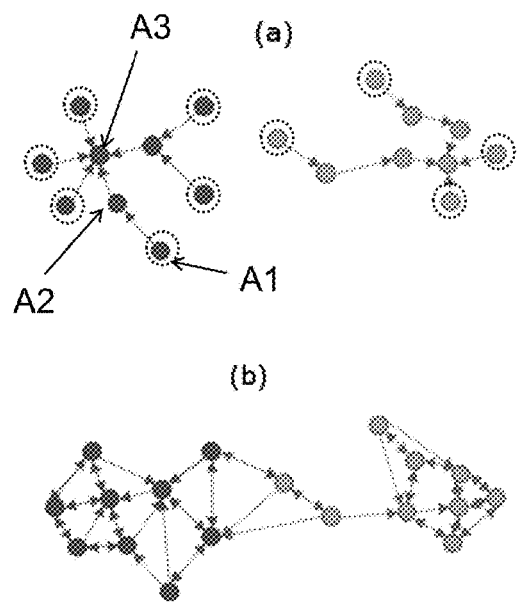
FIG. 5 shows: (a) an example of a bond graph in which each event is joined to the closest event that is denser than said event, and (b) an example of a bond graph in which an event is joined to the 3 closest neighbor events.

Iteration on the events can be done, for example, by going through the events in order of increasing density, in order of decreasing density or in a random order. After the iterative process, a series of groups are obtained with a bond graph of events for each of the groups. The bond graph is defined as the unions existing between the events of a group. As in the preceding stages, each event has been connected with the closest event denser than it is, the connections performed in clustering stage a) can be defined as unions between events and that information can be used to construct the bond graph, as shown in FIG. 5a. In FIG. 5a, the bond graph represents the union to the closest neighbor event denser than a given event. In FIG. 5a, the union between events is represented by means of arrows, wherein the tip of the arrow points to the closest and denser neighbor event. In FIG. 5b, the bond graph represents the union with a predefined number of closest neighbor events with respect to a given event (in the example of the drawing the 3 closest neighbor events are considered). In FIG. 5b, the union between events is represented by means of arrows, wherein the arrow exits from the event considered and points to the 3 closest neighbor events with respect to said event. The number of neighbor events $K_{af}$ considered for constructing the bond graph according to the embodiment of FIG. 5b can be equal to or different from the number of neighbor events K considered in clustering stage a2). A bond graph such as the one in FIG. 5b, representing the union of each event with the $K_{af}$ closest neighbor events, can be used in the inter-group affinity calculation. The analysis of the bond graph, as well as the number of pairs of neighbor events existing between events of different groups or the distances between connected events, allows performing different controls on the formed groups.

Therefore, the method comprises a control stage b) for determining after stage a) if there is an unwanted connection between events, for example a connection between events of one and the same group involving an anomaly. To that end, maximum distance thresholds between events of one and the same group are established, and in the case that the distance between two connected events of one and the same group is greater than said threshold, those two events are disconnected. As the events are being connected to denser neighbor events, the distances between connected events when going from the less dense zones to the more dense zones of a group must gradually decrease. Therefore, by going through the connections of the events and checking said distances, it is possible to determine if there is an anomaly.

In one embodiment of stage b), the bond graphs defined by the connections constructed in stage a) are taken, and for each group of events resulting from stage a) all the end events, i.e., those events which do not receive the connection with any event, are identified. In the example of FIG. 5a, the end events of the two groups are marked with a circle with a discontinuous line. The following steps are performed for each end event:

identifying the event A2 to which the end event A1 is joined and determining the distance between those two events, identifying the event A3 to which the event A2 is joined and determining the distance between those two events, repeating the process until reaching an event that is not joined to any event. This is the densest event of the group. In the case of FIG. 5a, the densest event is event A3 of the bond graph defined by the connection of events A1→A2→A3.

Figure 6:
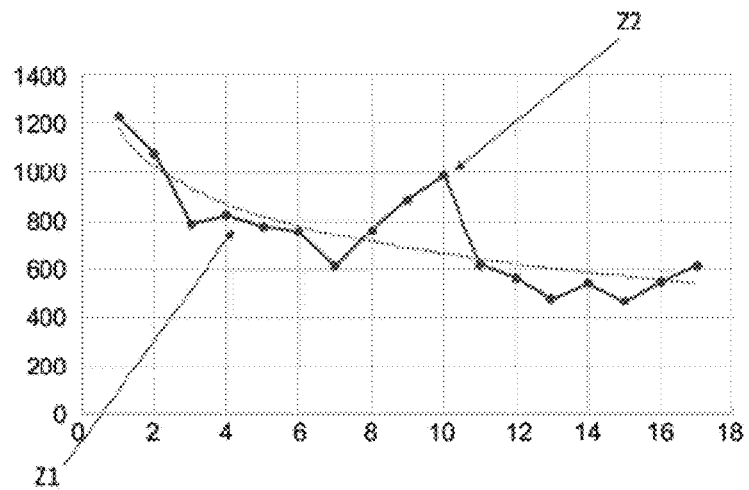
FIG. 6 shows a logarithmic regression diagram representing the distances between events of one of the bond graphs of one and the same group.

Now there is a series of unions and of distances between connected events starting from a specific end event. The distances between events connected along a bond graph, from one end event of a group, are represented in the graph of FIG. 6. In this case, the connections between many more events than those represented in FIG. 5a are represented. The connections between events connected along the bond graph are listed on the x-axis of the graph of FIG. 6, and the distance between connected events corresponding to said connections is represented on the y-axis. Therefore, the first dot (1 on the x-axis) would represent a distance of about 1230 between an end event e1 of the group and the event e2 to which it is joined; the second dot (2 on the x-axis) represents the distance between the event e2 and the event e3 to which it is joined, and so on and so forth until reaching the last dot (17 on the x-axis), representing the distance between the event e17 and the event e18 to which it is joined. The zone identified in Figure as Z1 corresponds to a reduction in distances, which means that the center of the group is being reached. The zone identified as Z2 shows an increase in distances, which means that what would be considered another group is being reached. The next step is to study those distances.

Different methods can be applied to define the maximum distance threshold. In one embodiment, the maximum distance threshold for a connection between two events is established as the maximum distance of the X connections of events previous to said connection between events in the current bond graph of events, X being the number of connections considered. In this case, if a connection between events exceeds the established maximum distance threshold for said connection, it would mean that one of the events has been joined to what would be considered another group. In this embodiment, the distances between the events connected along the bond graph are checked, determining that when the distance between two events is greater than the X previous distances in the bond graph, it is an anomalous distance, and in that case dividing the group between the two events represented by said distance. In one embodiment, X=3.

According to this embodiment, in the case of the example of FIG. 6 the following checks would be performed:

i. The first dot (1 on the x-axis) of the graph represents the distance between the end event e1 and the event e2 to which it is joined. Since there is no previous dot, the distance is determined to be correct.

ii. The following dot of the graph (2 on the x-axis) represents the distance between the event e2 and the event e3 to which it is joined. This distance is about 1080. Since this distance is not greater than the distance of the 3 previous connections (in this case there is only one previous connection, of a distance of about 1230), it is determined to be correct.

iii. The following dot (3 on the x-axis) represents the distance between the events e3 and e4. Said distance is about 800. Since the distance being greater than the distance of the three previous connections (1230 and 1080) is not met, it is determined to be correct.

iv. The method continues in the same way until going through all the dots (4 to 17 on the x-axis) representing the distances between events connected from the end event e1. In the case of finding a distance greater than the three previous distances, the events the connection of which corresponds to said distance are disconnected. For example, the distance of dot 9 (about 900) is greater than the 3 previous distances (785, 600 and 780), therefore the events e9 and e10 the connection of which corresponds to said distance would be disconnected, thereby forming two different groups of events, one group with all the events that are connected directly or indirectly (through other connections) with the event e9 and another group with all the events that are connected directly or indirectly with the event e10.

In this embodiment, checking distances between events along the bond graph is performed for all the bond graphs of each group, commencing with the end events of each group.

In another embodiment, the maximum distance threshold between two events of a group is established according to a logarithmic regression model estimated for the distances between the events connected along a bond graph, checking if there are large differences between the expected distance according to the regression model and the real distance. FIG. 6 shows a logarithmic regression diagram representing distances between events of one of the bond graphs within a group. The discontinuous curve represents the path expected according to the logarithmic model. In this embodiment, for establishing the maximum distance threshold a value is established that is Y times the mean of the absolute value of the differences between the logarithmic regression model value and the real distance value of all the connections between events of the bond graph.

In this embodiment, a logarithmic regression is performed with the values of the distances between connected events. When going through the bond graph from the end event to the densest event, the distance between connected events gradually becomes smaller. Logarithmic regression allows determining the difference between the expected value (i.e., the value of the discontinuous line in FIG. 6) and the real value (represented with dots). In one embodiment, the absolute value of the differences between the real and estimated values of the distances for all the connections of the bond graph are added together, the mean of said absolute values is found by dividing the sum by the number of connections of the bond graph, and it is determined if one of said differences is greater than Y times the calculated mean. If one of said differences is greater than Y times the mean of the differences, it is determined that it represents an anomalous distance and the two corresponding events are separated. In one embodiment, Y is 4. In one embodiment, the coefficient of determination of the regression model is furthermore determined, and this stage is applied only to the bond graphs for which the coefficient of determination is greater than or equal to a predefined threshold, i.e., to the bond graphs for which the regression model fits in a sufficiently correct manner with the results of the distances between events. The coefficient of determination is a statistic determining regression model quality.

Checking distances between events along the bond graph is performed for all the bond graphs of each group, commencing with the end events of each group.

As a result of the preceding stages, one or more groups of events are obtained. Then stage c) for joining related groups is performed. In stage c), the affinity of each pair of groups is calculated, and the groups the affinity of which is greater than a minimum affinity threshold are joined. The calculation of the affinity between two groups is performed based on the number of pairs of neighbor events existing between events of both groups and on the distances between said events and optionally taking into account the size of both groups. One option is to assign a weight to each pair of groups. To that end, the events of both groups are gone through searching for an event belonging to the other group among the $K_{af}$ closest neighbor events with respect to each event. In the case of finding it, the weight corresponding to said pair of neighbor events is added to the total affinity between both groups. FIG. 5b shows an example of a bond graph representing the joining of each event to the $K_{af}$ closest neighbor events. The more pairs of neighbor events between two groups and the closer the events of said pair of neighbor events, the higher the affinity is assigned to that pair of groups. For example, one way to estimate the weights assigned to the pairs of neighbor events is with a negative exponential function:

$$\exp\left(-\frac{\|x_i - x_j\|^2}{2\sigma^2}\right) \quad \text{(Eq. 7)}$$

where $\|x_i - x_j\|$ is the distance between the events and $\sigma$ is a configurable parameter, where each event belongs to one of the groups.

In one embodiment, once the weights between pairs of neighbor events of both groups are calculated, the weights are weighted to the size of the groups, thereby also favoring the joining of groups with few events.

In one embodiment, the affinity between groups is calculated by means of mathematical expressions (Eq. 4) to (Eq. 6), the parameter $\sigma$ corresponding to each group being defined by expressions (Eq. 3a) or (Eq. 3b).

Stages for reducing the computational cost of the method of the invention can additionally be used, and data cleaning stages, such as the elimination of outliers (events not representative of the sample) can also be added.

Database (5)

The method of classification of the invention uses one or more databases in the classification phase. The database (5) includes different reference groups, which are used for the comparison with the sample groups to be analyzed. The reference groups represent the classification of the events in biological populations (for example, leukocyte populations) or artificial populations (for example, microspheres). The more precise the classification of reference groups included in the database (5), the greater the precision of the results of the method.

Preferably, the database (5) is constructed by defining the structure of reference groups that will be included in the database (5) and by feeding data files analyzed by experts into the database (5). As a result, a database (5) with reference groups formed by the data relating to events contained in the entered files is obtained.

Preferably, the data fed into the database (5) comes from the analysis of biological samples, always applying one and the same protocol, or the analysis of samples of functionalized non-biological particles. The values of each of the parameters of all the events forming a reference group are obtained from these analyses of samples, therefore the databases will contain information about known populations and subpopulations associated with said groups of events.

Figure 7:
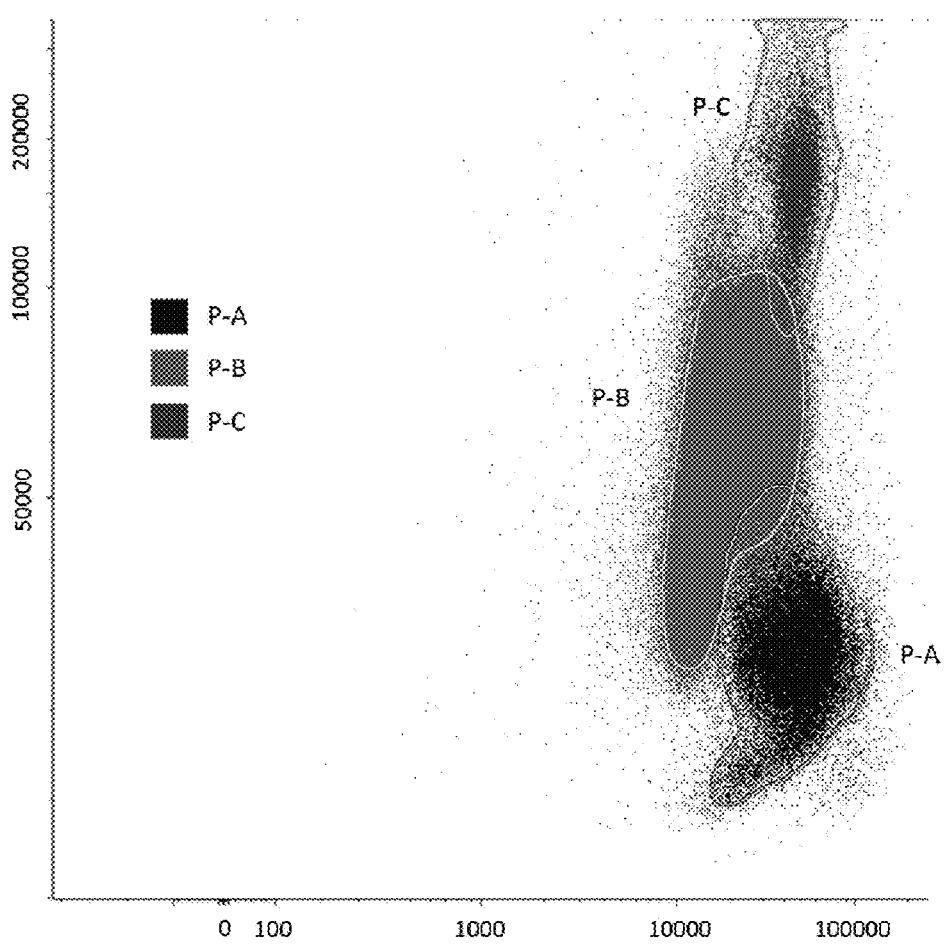
FIG. 7 shows an example of three reference groups (P-A, P-B and P-C).

FIG. 7 shows three reference groups (P-A, P-B and P-C) of a dynamic database (5) constructed from digital information libraries previously analyzed by an expert.

Preferably, additional files analyzed by experts and/or with the data of groups resulting from the classification performed by the method of the invention will continue to be fed into the database (5). Advantageously, the variability of the database (5) thereby increases. Information can additionally or alternatively be fed back into the database (5) using external databases. Preferably, the database (5) is editable, allowing modification to include new reference groups, to eliminate and/or modify existing reference groups.

Second Phase: Classification of the Formed Groups by Means of Comparison with the Reference Groups from the Database (5)

The classification stage comprises comparing each sample group formed as a result of the preceding stages with at least one reference group from the database (5). The comparison of a sample group with a reference group comprises reducing the dimensionality of the data of the sample group together with the data of the reference group until obtaining a two-dimensional representation of both groups, and determining the medians and deviation curves of the reference groups.

Preferably, the comparison of the sample groups with the reference groups is performed by applying a principal component analysis (PCA) algorithm or a canonical correlation analysis (CCA) algorithm.

Principal component analysis and canonical correlation analysis allow reducing the dimensionality of the data of the groups, in turn extracting the most important characteristics of the groups, and allow representing the groups in 2D graphs without losing important information. In the case of PCA, this analysis identifies the two-dimensional representations with greater variance of the data. In the case of CCA, this analysis identifies and quantifies the relationships between two groups finding the two-dimensional representation maximizing the separation between both groups.

Said two-dimensional representations allow graphically displaying as a reference image the deviation curves of all the weighted parameters of all the events making up the reference group in the database (5) on which the sample groups to be analyzed will be compared. Said reference image can be used for establishing the limits of belonging to the reference group.

In one embodiment based on canonical correlation analysis (CCA), obtaining the canonical axes for two-dimensionally representing the groups comprises the following stages:

1) Given g groups of events with sizes $n_1, n_2, \ldots, n_g$, the sample covariance matrix of each group $S_a$ is calculated, where the size of a group is the number of events that it includes. In the case of a comparison between a sample group and a reference group from the database (5), g=2.

2) The scattering matrix is obtained within groups W (also referred to as within groups matrix):

$$W = \sum_{\alpha=1}^{g} n_\alpha S_\alpha \qquad (Eq. 8)$$

3) The weighted covariance matrix within the groups $S_p$ (also referred to as pooled within matrix) is obtained from the scattering matrix within groups W:

$$S_p = \frac{1}{n-g} W \qquad (Eq. 9)$$

n being the number of total events in the groups that are compared.

4) The scattering matrix between the groups B is calculated (also referred to as between groups matrix):

$$B = \sum_{\alpha=1}^{g} n_\alpha (\overline{X}_\alpha - \overline{X}) \cdot (\overline{X}_\alpha - \overline{X})^t \qquad (Eq. 10)$$

$\overline{X}_\alpha$ being the mean vector of group α, and $\overline{X}$ being the sample (or global) mean vector, and where $(\overline{X}_\alpha - \overline{X})^t$ denotes the transposition of $(\overline{X}_\alpha - \overline{X})$. The mean vector of a group is a vector in which the value of each dimension is the mean of the values of the events of that group for each parameter. For example, in the case of a group with 7 parameters (dimensions) and 1000 events, the mean vector would be a vector of 7 dimensions where the first value would be the mean of the 1000 values of parameter 1, where the second value would be the mean of the 1000 values of parameter 2, and so on and so forth until obtaining the mean for the 7 parameters. The global mean vector is constructed the same way, but counting all the events of the groups involved (in the case of a comparison between a sample group and a reference group, they would be the events of those two groups).

5) Coefficients $a_1$, $a_2$, . . . of the canonical axes are obtained from diagonalization of the scattering matrix between the groups B with respect to the weighted covariance matrix within the groups $S_p$, and these coefficients can be used to calculate the canonical axes, where j is the number of dimensions (i.e., the number of parameters measured for each event), $x_{ij}$ is the value of the event i for dimension j and y is the value of the event i transformed on the canonical axis:

$$y = a_1 x_{i1} + a_2 x_{i2} + \ldots + a_j x_{ij} \qquad (Eq. 11)$$

Comparative 2D graphs can then be created where the events are represented according to the axes obtained by means of the dimensionality reduction technique. If the compared groups are not separated in the two-dimensional representation resulting from the dimensionality reduction technique, it is because they correspond to the same population.

Therefore, each group obtained in the clustering phase is compared with the reference groups from the database (5). In one embodiment, said comparison is performed in three stages. In the first stage the candidate reference groups (those which may correspond to the group to be classified) are selected, comparing the incoming group (i.e., the sample group to be classified) in as many comparisons based on CCA as there are combinations of two reference groups in the database (5) and selecting as candidate reference groups those reference groups from the database (5) containing within its deviation curves, in a larger number of comparisons, the median of the group to be classified and/or a predetermined percentage of events of the group to be classified. In the case of there being more than one candidate reference group, a tie-breaking stage for breaking the tie between candidate reference groups is performed, selecting the reference group having more medians close to the median of the incoming group. Finally, a final validation stage for validating the selected candidate reference group is performed through a canonical comparison based on CCA between the group to be classified and the selected candidate reference group. The first two stages are optional, but it is advantageous to perform them for performance issues because if the comparisons between the reference groups from the database (5) are pre-calculated, the incoming group can be represented on the already pre-calculated coefficients of canonical analysis of the reference groups, so the method is rapid. In contrast, the final comparison between the group to be classified and a reference group from the database (5) is performed including the group to be classified for calculating the axes and is much slower.

Alternatively, comparisons can be made between the group to be classified and each of the reference groups from the database (5), without making a pre-selection of candidate reference groups through the simultaneous comparisons with two reference groups from the database (5).

Therefore, in one embodiment, the following steps are performed for classifying an incoming group:

1) Two-dimensional representations are created based on the CCA using all the combinations of 2 reference groups existing in the database (5), regardless of the order.

Figure 8:
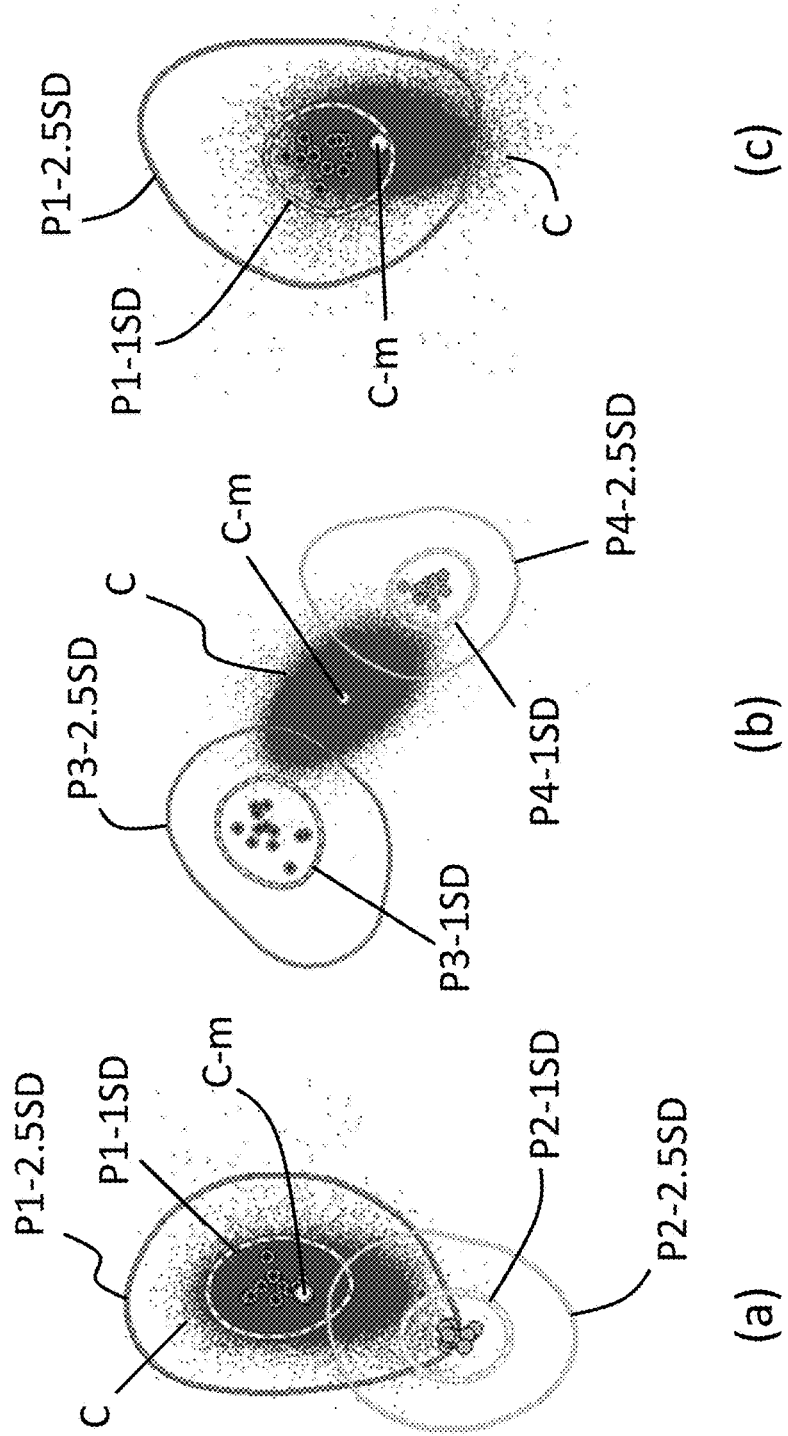
FIG. 8 shows three comparisons of a group of events to reference groups from the database.

2) The incoming group (sample group) to be classified is represented on said two-dimensional representations. FIG. 8 shows three comparisons where the sample group to be classified (C) against the reference groups (P1, P2, P3, P4) from the database (5) are represented. In FIG. 8(a) the group to be classified (C) is compared with reference groups P1 and P2, which respectively correspond to neutrophil and monocyte populations. In FIG. 8(b), the group to be classified (C) is compared with reference groups P3 and P4, which correspond to eosinophil and erythrocyte populations, respectively. FIG. 8(c) corresponds to the comparison of the group to be classified (C) with just the neutrophil reference group (P1). Deviation curve 1SD (represented with a discontinuous line), deviation curve 2.5SD (represented with a continuous line) and the medians (represented as dots) have been represented for each reference group in the drawings. Deviation curve 1SD represents the closed curve containing therein 68.2% of the events of the reference group. Deviation curve 2.5SD represents the closed curve containing therein 98.7% of the events of the reference group. These deviation curves have been identified in FIG. 8 as "1SD" or "2.5SD", as the case may be, preceded by the name of the corresponding reference group (P1, P2, P3 or P4). For example, curve "P1-1SD" is the deviation curve 1SD of the reference group P1. In FIG. 8, the medians are represented as dots. The medians of each reference group are contained within the deviation curves of said reference group. The medians of each reference group from the database (5) represent each analysis forming said population. That is, if the neutrophil population is formed by the analysis of 11 samples, one median per analysis is represented. In this case, there would be 11 medians. Preferably, the deviation curves of the reference group are with respect to the total population of the reference group. In FIG. 8, the median of the sample group to be classified has been represented as a white dot and referred to as "C-m" to differentiate it from the medians of the reference groups.

By using the comparisons of the group to be classified with the pairs of reference groups, the method identifies which reference groups from the database (5) contain, in a larger number of comparisons, the median of the group to be classified and/or a predetermined percentage of events of the group to be classified within its deviation curves. Those reference groups are taken as candidate reference groups. In the example of FIG. 8, deviation curve 2.5SD has been used for the comparisons, but in other embodiments another deviation curve can be used.

3) In one embodiment, if more than one candidate reference group is identified, a tie-breaking stage is performed to select a final candidate reference group. In one embodiment, the candidate reference group having more medians close to the median of the incoming group is selected in the tie-breaking stage. In this case, the distance between the median of the incoming group and the medians of the reference group is determined. The Euclidean distance can be used to determine the medians closest to the median of the incoming group. In another embodiment, the candidate reference group containing a higher percentage of events of the incoming group within its deviation curves is selected in the tie-breaking stage. As a result of the tie-breaking stage, a final candidate reference group is selected. In this embodiment, regardless of the criterion used (median and/or percentage of events), the two-dimensional representations of said candidate reference groups together with the incoming group are used to select a single final candidate reference group according to the closeness of the median and/or the percentage of events described above, determining in each of the representations which reference group has the median closest to the median of the incoming group or has a higher number of events of the incoming group within its deviation curves in a larger number of comparisons. The candidate reference group having the median closest to the median of the incoming group or having more events of the incoming group contained within its deviation curves in a larger number of comparisons is selected as the final candidate reference group. When the closeness of the median of the reference group to the median of the incoming group is used as a criterion, the closest median of the reference group or the mean of the medians of the cases included in the reference group can be used.

4) Subsequently, a comparison is performed between the incoming group and the selected final candidate reference group (if there were one). The comparison is also performed in a two-dimensional representation based on the canonical correlation analysis, using the median of the incoming group and the deviation curves of the reference group from the database (5) and/or using a predetermined percentage of events of the incoming group and the deviation curves of the reference group from the database. In the case of using the classification criterion based on the median of the incoming group, if the median of the incoming group is within the deviation curve of the reference group it will be understood that they are the same group and will be classified as such. FIG. 8(c) shows the final comparison against the selected candidate reference group, corresponding to the neutrophil population. In the case of using the classification criterion based on the predetermined percentage of events of the incoming group, it will be understood that the incoming group corresponds with the reference group if the percentage of events of the incoming group contained within the deviation curve of the reference group is equal to or greater than said predetermined percentage.

In one embodiment, when more than one candidate reference group is identified, the tie-breaking stage is performed through an individual comparison in a two-dimensional representation based on the canonical correlation analysis between each candidate reference group and the incoming group, and that candidate reference group containing the median of the incoming group within its deviation curves which presents more closeness between the median of the incoming group and the median of the reference group closest to the median of the incoming group is selected. Another option is to select that reference group which has a higher percentage of events of the incoming group within its deviation curves.

In one embodiment, if there are two or more candidate reference groups, the method identifies the population as unknown without performing a tie break or a 1 to 1 comparison, or it identifies the population as corresponding to said candidate reference groups but without specifying which one.

In one embodiment, a selection phase for selecting candidate reference groups is not performed, but rather the incoming group is compared on an individual basis with each of the reference groups from the database using two-dimensional representations based on the canonical correlation analysis, and that reference group containing the median of the incoming group within its deviation curves which presents more closeness between the median of the incoming group and the median of the reference group closest to the median of the incoming group is selected. In another embodiment, that reference group having a higher percentage of events of the incoming group within its deviation curves is selected.

Although an algorithm based on canonical correlation analysis (CCA) has been used in the preceding examples, other types of algorithms can be used for two-dimensionally representing the groups, such as one based on PCA, and function can be added with improve the speed, tie-breaks, or classification. Furthermore, as described, the criterion to select reference groups as candidate reference groups can be according to the position of the median of the incoming group with respect to the deviation curves of the reference groups and/or according to the percentage of events of the incoming group falling within the deviation curves of the reference groups.

Figure 9:
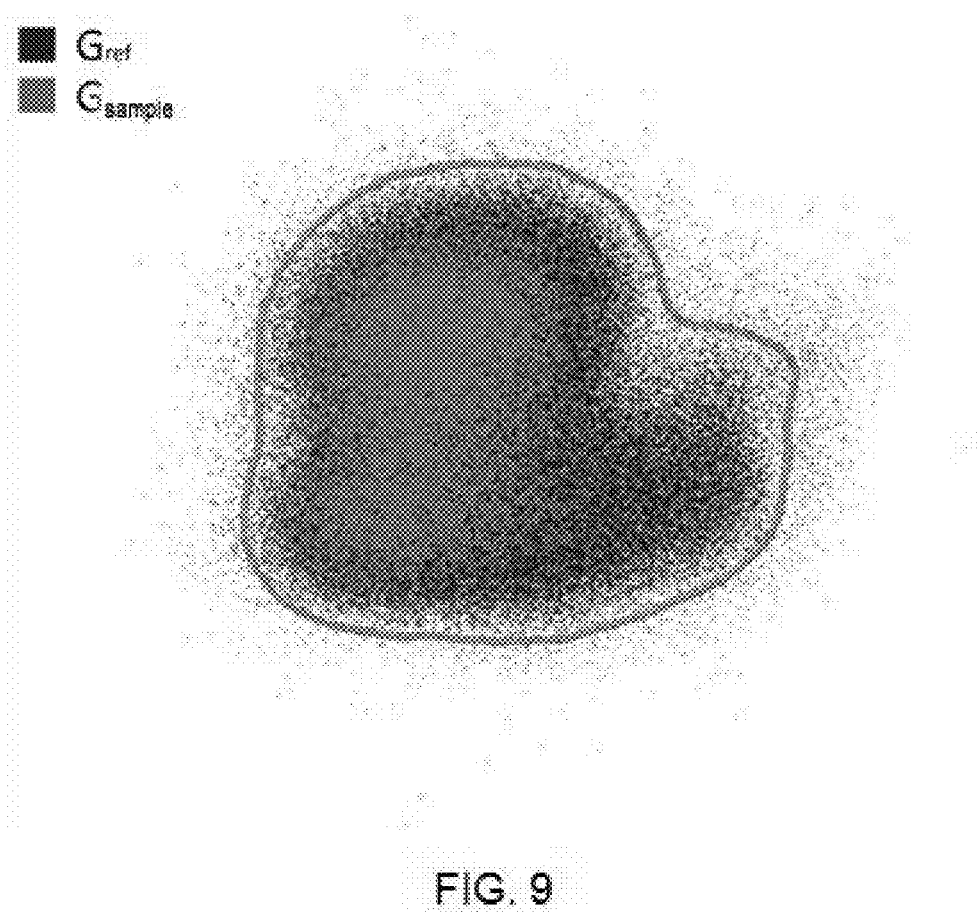
FIG. 9 shows a comparison of the events of a group of a sample subject of study (gray dots) fused to the events of a reference group (black dots).

FIG. 9 shows a comparison of the events of the sample group subject of study (represented as gray dots and identified as $G_{sample}$) fused to the events of the reference group (represented as black dots and identified as $G_{ref}$). The deviation curve of the reference group is furthermore represented. Since the group subject of study is within the deviation curve of the reference group, it is considered that they belong to the same population.

In addition to this phenotypic classification, according to the expression of the populations in the different parameters forming the sample, in one embodiment there is an additional stage in which other data is checked, such as the percentage of events of a population with respect to other populations or any other type of statistic that can be inferred from the reference groups from the database (5). To that end, in one embodiment the method additionally comprises checking compliance with one or more rules previously defined about the reference groups from the database (5), for the purpose of comparing statistical parameters that were not previously taken into account, such as the percentage of events of a given group in the sample, a ratio between two groups or any other statistical data that can be inferred from the data stored in the database (5). Preferably, these rules can be modified, added or updated over time. It is advantageous to implement these rules because many times aberrations do not come from the expression of the parameters themselves, but rather from statistical data associated with the groups. For example, when comparing the sample groups with the groups from the database (5), all their parameters may have a normal expression, but that does not means that there is no aberration. The aberration can be the fact that those events are in the sample with an anomalous frequency. Therefore in one embodiment, the database (5) includes rules whereby at least one statistical parameter of the identified groups is checked, taking the ranges of normality obtained from the reference groups from the database (5) as normal values and the values that are outside said ranges as anomalous values.

In one embodiment, these rules can be used for generating a warning according to their compliance and/or can be used as a discrimination parameter for classifying a group as a given population from the database (5). That is, if an incoming group is identified as corresponding to a population A but has a percentage of events outside of what is normal, using the percentage of events in the population as a discrimination parameter, it can be concluded that the group corresponds to a population B, population B being equal to A but with different percentages of events.

As a final result of the method, a series of populations classified by comparison with previously known populations defined in the database (5) are obtained. Furthermore, if the method includes a checking stage for checking compliance with at least one predefined rule, the result can include one or more warnings, if one of the predefined rules is not complied with for one of the classified populations. The degree of accuracy when classifying the sample groups in populations depends on the reliability of the reference groups defined in the database (5). Additionally, the sample groups can be used to feed information back into the database (5) for joining and increasing the already existing populations (reference groups), such that the knowledge in the initial database (5) is expanded by introducing new reference groups and increasing the information about those already existing. A sample group may not be classified if it does not correspond to any of the reference groups from the database (5).

Once the events have been clustered and classified in populations, it is possible to construct graphic representations which will help to see the results of the analysis by the human eye. The summary of the identified and unidentified populations can be shown, for example, in a pie chart constructed on different levels and by means of using a color code. This example allows displaying the number and percentage of representativity on the global sample of each of the populations. Furthermore, by using visual alarm systems (colors, special characters, etc.) it is possible to focus the user's attention on those populations that are defined outside the limits of normality defined by the databases, and that are ultimately going to be those which will require subsequent analysis.

EXAMPLE

The example described below demonstrates the capacity of the method of the invention for the automatic classification of different cell types present in a peripheral blood sample analyzed by flow cytometry. The blood sample was lysed with a lysing solution to remove the erythrocytes. It will be understood that the use of flow cytometry in this example does not limit the application of the invention in other fields of cell biology, genomics, proteomics, metabolomics or others.

For better understanding, the complete process of an assay is described below. The assay commences with marking a peripheral blood sample subject of study with the combination of fluorochrome-conjugated cell markers that are simultaneously studied in each cell to evaluate lymphocyte populations. This example uses the LST combination described in patent document WO2010140885A1 and defined in the following table:

|  | Fluorochrome | | | | | | | |
| --- | --- | --- | --- | --- | --- | --- | --- | --- |
|  | PacB | OC515 | FITC | PE | PerCP-Cyanine5.5 | PE-Cyanine7 | APC | APC-C750 |
| Marker | CD20 + CD4 | CD45 | CD8 + SmIgλ | CD56 + SmIgK | CD5 | CD19 | SmCD3 | CD38 |

In this case the different expression levels of the markers and the presence or absence thereof define the different cell populations and subpopulations making up the sample.

Once processed, the samples are analyzed in the flow cytometer (e.g. FACSCanto II, BDB Biosciences, San Jose, Calif., USA), such that each cell individually passes and is exposed to a laser light beam which allows obtaining information about the physical properties of each event of the sample and about the fluorescence measurements indicating the expression levels of the markers. The information is subsequently provided in a data format standard for FCS (flow cytometry standard) cytometry.

In the FCS format, each combination of events and parameters associated with one another is represented by a matrix where the events are stored in rows and the parameters (10 in this case) are stored in columns. This data in this format is processed in the automatic clustering phase, providing as a result a series of groups of events representing a series of respective cell populations, not yet classified. In this example, the number of neighbor events used is $K_{af}=K=10$ and the minimum affinity threshold is 0.5. In this embodiment, the density has been calculated according to the distance of each event to the $K_{den}=K$ neighbor events. In this example, the affinity between groups has been calculated by means of mathematical expressions (Eq. 4) to (Eq. 6), with the parameter σ calculated for each group according to expression (Eq. 3a).

Subsequently, those groups of events go through the automatic classification phase, in which they are compared to the reference groups included in the database (5). In this example, a database (5) previously constructed through the analysis of a large number of normal peripheral blood samples labeled with the same combination of markers following the same method is used. In the prior analysis of said samples, the following main populations were identified through an expert analysis: T CD4+CD8− lymphocytes, T CD8+CD4− lymphocytes, T CD4−CD8−TCRgd+ lymphocytes, T CD4−CD8−TCRgd− lymphocytes, kappa B lymphocytes, lambda B lymphocytes, NK lymphocytes, plasma cells, eosinophils, monocytes, neutrophils, dendritic cells and basophils. Debris (i.e., non-valid events) and doublets (i.e., two cells bound to one another) of each population were also identified. A database (5) of 10 dimensions defining the different populations found in the samples analyzed with the parameters defining each population in each case was created with the values of the parameters measured and known for said type of sample. The degree of precision when classifying the groups will depend on the amount and quality of the information contained in the database (5) against which it is going to be compared; the more complete the database (5), the more precise the identification of populations in the sample.

In this example, a dimensionality reduction algorithm based on canonical correlation analysis (CCA) as described in relation to mathematical expressions (Eq. 8) to (Eq. 11) was used for the automatic classification of the sample groups. By means of the comparisons between pairs of reference groups and each sample group to be classified, the candidate reference groups were identified for each sample group, as described above. Subsequently, a comparison was performed in a dimensional representation based on a CCA between each sample group and the selected candidate reference group. In the case that a sample group does not coincide with any reference group included in the database (5), it is considered that said group corresponds to a different and therefore unknown population and cannot be classified by the database (5). For the comparison with the reference groups, the parameters measured for the events of the sample must coincide with the parameters included in the database for the events of the reference groups. In the case that there are parameters relating to the events of the sample that are not included in the database, these parameters are not taken into account when compared with the reference groups from the database. Preferably, those parameters are not taken into account in any stage of the method of the invention.

In this example, the following normal populations in the analyzed sample were identified with the method of the invention: T CD4+CD8− lymphocytes, T CD8+CD4− lymphocytes, T CD4−CD8−TCRgd+ lymphocytes, T CD4−CD8+TCRgd− lymphocytes, kappa B lymphocytes, lambda B lymphocytes, NK lymphocytes, plasma cells, eosinophils, monocytes, neutrophils, dendritic cells and basophils. Debris (non-valid events) and doublets of each population were also identified. Furthermore, a series of groups were not classified as they had no correspondence with any population in the database (5).

Figure 10:
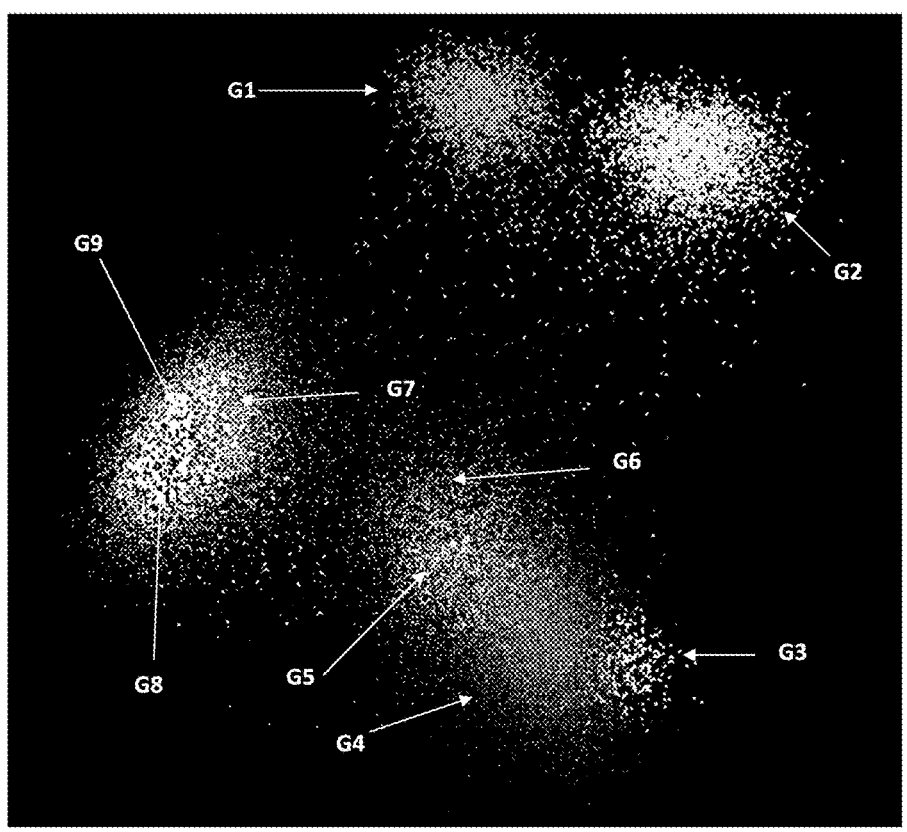
FIG. 10 shows an example of a two-dimensional representation of the groups of a sample automatically identified by means of the method of the invention.

FIG. 10 shows a representation of some of the identified sample groups.

G1: T CD4+CD8− lymphocytes
G2: T CD8+CD4− lymphocytes,
G3: eosinophils
G4: neutrophils
G5: monocytes
G6: dendritic cells
G7: lambda B lymphocytes
G8: kappa B lymphocytes
G9: Non-normal population without correspondence with any reference group from the database (5).

Conclusions about the composition of the analyzed sample can be obtained from the results obtained by means of the method of classification, taking the following criteria into account:
 If by means of the comparison of the sample to be analyzed with the database (5) all the sample groups can be identified with a high percentage of certainty as normal populations in the database (5), it can be concluded that it is a normal sample.
 If by means of the comparison with the database (5) a sample group can be identified with a high percentage of certainty as unknown populations in the database (5), it can be concluded that it is a sample in which there are aberrant populations because they present an absence of the expression of a marker considered normal for a population or they present an expression of a marker considered not normal for a population or present statistical data considered not normal for a population (for example, a normal marker in an anomalous percentage with respect to other populations) and it would be necessary to conduct more tests, for example by experts. In the specific case of the example, aberrant population G9 was identified as a pathology known as CD10-positive diffuse large cell lymphoma, which expresses marker CD10, considered not normal.

Finally, once the sample groups object of the analysis were formed and classified, the graphic representations of the sample groups on the dynamic database (5) allow seeing the identified and unidentified populations and knowing the degree of variation of each of the parameters defining the populations. By using a dynamic database (5) in this case, it is possible to feed the populations resulting from the classification back into the initial database (5), making the identification of said populations in subsequent analyses easier.

Figure 11:
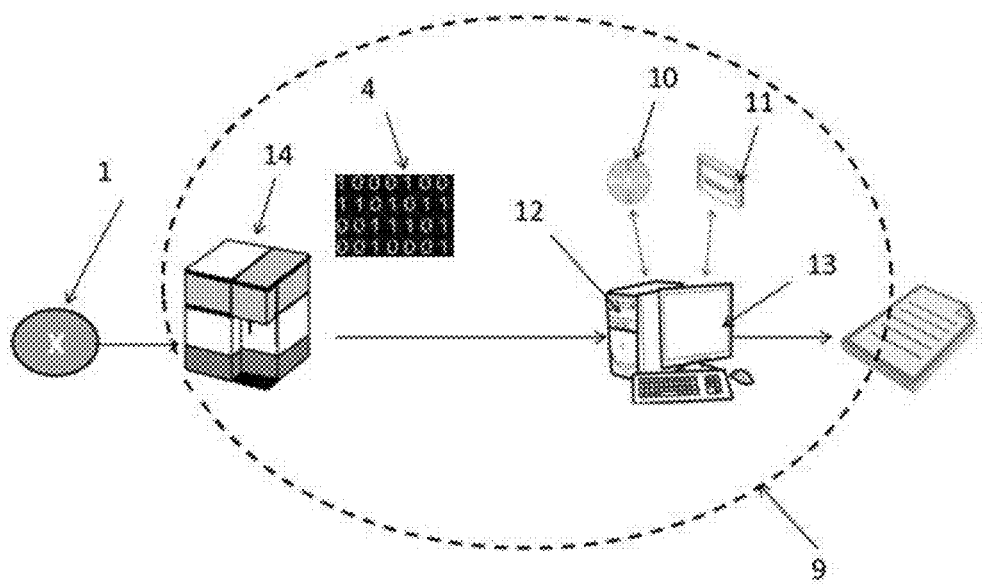
FIG. 11 schematically shows an example of the system for classifying events according to an embodiment of the invention.

FIG. 11 shows an embodiment of the system (9) for classifying multidimensional digital data (4) relating to events of a sample (1). In this example, the system (9) comprises the elements within a circle formed by a dashed line, particularly:
 A processing module (12), in this case a computer with a keyboard and mouse.
 A representation module (13), in this case a display.
 An analysis and acquisition module (14), in this case hardware and/or software.

As can be seen in FIG. 11, the acquisition module (14) detects events of the sample (1) to be studied and obtains the parameters (4) associated with said events. Subsequently, the processing module (12) receives the parameters (4) and performs the method of the invention classifying said parameters (4), and accordingly, classifying said events. In a final stage, the system (9) shows through the display (13) the classification obtained using the method of the invention.

The invention claimed is:

1. A computer-implemented method for classifying events present in a sample, wherein each event is characterized by a multidimensional set of parameters obtained by means of hardware and/or software, wherein the values of the parameters associated with each event define the position coordinates of said event in a multidimensional space, the method comprising the following steps:
 a) clustering the events in groups, comprising:
  a1) determining a density of each event, and
  a2) connecting each event with its closest neighbor event denser than it is, from among the K closest neighbor events with respect to said event in the multidimensional space, K being a predefined natural number, such that the events connected to one another form a group, and wherein in the case of not finding a denser event among the K closest neighbor events, a group is formed with the events that have been connected with one another and step a2) continues to be performed with another event to start forming a new group;

b) checking if within each formed group there is a connection between events exceeding a maximum distance threshold, said maximum distance threshold being established based on the connections between events of the group itself, and in the case a connection between events exceed said maximum distance threshold, disconnecting those events, generating two subgroups for each pair of events that are disconnected;

c) calculating an affinity between each pair of sample groups resulting from the preceding step, wherein the affinity between two sample groups is calculated based on the number of pairs of neighbor events verifying that one of the events of the pair of neighbor events is one of the $K_{af}$ closest neighbor events with respect to the other event of the pair of neighbor events and in which one of the events of the pair of neighbor events is part of one of said two groups and the other event of the pair of neighbor events is part of the other one of said two groups, and based on the distances between said events, $K_{af}$ being a predefined natural number; and joining the two sample groups when the affinity between said groups exceeds a pre-established minimum affinity threshold;

d) comparing each sample group with at least one reference group stored in at least one database, wherein the comparison comprises:
reducing a dimensionality of the data of the sample group together with the data of the reference group until obtaining a two-dimensional representation of both groups, and
determining for each two-dimensional representation the medians and deviation curves of the reference groups; and e) classifying the sample groups based on the comparisons with the reference groups, using as a classification criterion the belonging of the median of the sample group and/or the belonging of a minimum percentage of events of the sample group to the deviation curves of the reference groups from the database.

2. The method according to claim 1, wherein in step a) the density of each event is determined from a mean distance of said event to the $K_{den}$ closest neighbor events with respect to said event, or from the sum of the distances of said event to the $K_{den}$ closest neighbor events with respect to said event, $K_{den}$ being a predefined natural number, $K_{den}$ preferably being equal to K, or as the number of events found at a distance from said event less than or equal to a specified distance.

3. The method according to claim 1, wherein in step b) the maximum distance threshold between two events of a group is established according to a logarithmic regression model estimated for distances between connected events of said group.

4. The method according to claim 1, wherein in step c) the affinity between two groups is calculated by assigning a weight determined by a negative exponential function to each pair of neighbor events in which one of the events of the pair of neighbor events is part of one of said two groups and the other event of the pair of neighbor events is part of the other one of said two groups.

5. The method according to claim 1, wherein in step d) each sample group is compared simultaneously with pairs of reference groups from the database, wherein as many comparisons are performed as there are combinations of two reference groups in the database for each sample group, and wherein a final comparison is performed between the sample group and a candidate reference group, the candidate reference group being the reference group from the database containing the median of the sample group and/or a minimum percentage of events of the sample group within its deviation curves in a larger number of comparisons.

6. The method according to claim 5, wherein in the case there is more than one candidate reference group, the reference group having more medians close to the median of the sample group is selected for classification.

7. The method according to claim 1, wherein in step d) dimensionality is reduced by means of principal component analysis or by means of canonical correlation analysis.

8. The method according to claim 1, wherein the events are particles, preferably cells, organelles, vesicles, viruses and/or spheres.

9. The method according to claim 1, wherein $K=K_{af}$.

10. The method according to claim 1, further comprising evaluating compliance with at least one predefined rule, wherein said rule is based on at least one statistical parameter the reference value of which is inferred from the reference groups from the database.

11. The method according to claim 10, wherein the evaluation of compliance with said at least one rule is used as an additional criterion in the classification of the sample groups.

12. The method according to claim 1, wherein the sample is:
a biological sample, preferably selected from the group consisting of tissue, biofluid, food, beverage, cell culture and mixtures thereof, and/or
a mixture of functionalized non-biological particles.

13. A system for classifying events present in a sample, wherein each event is characterized by a multidimensional set of parameters, the system comprising at least one processing module, configured for receiving the parameters characterizing the events of the sample and for performing a method according to claim 1.

14. The system according to claim 13, further comprising at least one representation module configured for representing the results of the classification.

15. A computer program comprising instructions that are stored on a non-transitory computer-readable medium, wherein the instructions cause a computer to perform the method according to claim 1.

* * * * *